(12) United States Patent
Quenzi et al.

(10) Patent No.: US 6,178,669 B1
(45) Date of Patent: Jan. 30, 2001

(54) PLOW HITCH ASSEMBLY FOR VEHICLES

(75) Inventors: Philip J. Quenzi, Atlantic Mine; Cal G. Niemela, Chassell, both of MI (US)

(73) Assignee: Blizzard Corporation, Calumet, MI (US)

( * ) Notice: Under 35 U.S.C. 154(b), the term of this patent shall be extended for 0 days.

(21) Appl. No.: 09/243,908

(22) Filed: Feb. 3, 1999

(51) Int. Cl.[7] ..................................................... E01H 5/04
(52) U.S. Cl. ................................ 37/231; 37/234; 37/236; 37/266; 172/275
(58) Field of Search ............................. 37/271, 231, 234, 37/236, 270, 266; 172/274, 272, 275

(56) References Cited

U.S. PATENT DOCUMENTS

| | | |
|---|---|---|
| Re. 35,700 | 12/1997 | Watson et al. .......................... 37/231 |
| 1,556,508 | 10/1925 | Hentzell et al. . |
| 1,786,974 | 12/1930 | Abbe . |
| 1,925,397 | 9/1933 | Meyer . |
| 1,964,617 | 6/1934 | Bird . |
| 2,088,564 | 8/1937 | Anthony et al. . |
| 2,116,351 | 5/1938 | Jones et al. . |
| 2,144,311 | 1/1939 | Klauer . |
| 2,144,312 | 1/1939 | Klauer . |
| 2,276,265 | 3/1942 | Sturtz . |
| 2,426,410 | 8/1947 | Owen . |

(List continued on next page.)

FOREIGN PATENT DOCUMENTS

| | | |
|---|---|---|
| 1153885 | 9/1983 | (CA) ........................................ 37/23 |
| 471288 | 5/1969 | (CH) . |
| 2333141 A1 | 1/1975 | (DE) . |
| 31681 | 11/1961 | (FI) . |
| 1147442 | 11/1957 | (FR) . |
| 56361 | 3/1936 | (NO) . |
| 128695 | 7/1947 | (SE) . |
| 129907 | 7/1947 | (SE) . |
| 1310472 | 5/1988 | (SU) . |

OTHER PUBLICATIONS

Diamond SnowPlows; Diamond Machine Co., entire brochure, Date Unknown.
Fisher Snowplows, Fisher Engineering; 1994, entire brochure.
Fisher; Fisher Engineering; 1989, entire brochure.
Good Roads Machinery Corporation, catalog, 1940, pp. 1–38.
Hiniker Plows; Hiniker Company, entire brochure, Date Unknown.
Meyer Snow Plows; Meyer Products, 1993, entire brochure.
The Boss Snowplow ; Boss products, 1995, entire brochure.
Western Snowplows; Western Products, entire brochure, Date Unknown.

* cited by examiner

*Primary Examiner*—Christopher J. Novosad
(74) *Attorney, Agent, or Firm*—Van Dyke, Gardner, Linn & Burkhart, LLP

(57) ABSTRACT

A hitch assembly provides removable connection of a plow assembly to a push beam assembly installed on a vehicle. The hitch assembly includes a draw latch assembly which engages the push beam assembly and pulls the plow assembly into position for pivotal attachment of the plow assembly to the vehicle. The draw latch assembly is activated by a power source, such as an hydraulic cylinder, and is further interconnected with a lift arm assembly such that further extension or activation of the hydraulic cylinder results in a raising or lowering of the plow blade. Also included is an easy connection and release mechanism for inserting and retracting pivot pins through corresponding brackets on the lift arm assembly and push beam assembly. A light tower assembly is removably attached to the push beam assembly such that when the plow is not in use, only the push beam assembly and its mounting brackets remain on the vehicle in a position below and rearward of a front bumper of the vehicle.

66 Claims, 24 Drawing Sheets

U.S. PATENT DOCUMENTS

| | | |
|---|---|---|
| 2,430,221 | 11/1947 | Frink et al. . |
| 2,440,905 | 5/1948 | Maxim et al. . |
| 2,522,934 | 9/1950 | Engnell et al. . |
| 2,667,708 | 2/1954 | Gjesdahl . |
| 2,710,464 | 6/1955 | Husting . |
| 2,722,066 | 11/1955 | Wills et al. . |
| 2,740,213 | 4/1956 | Barrett . |
| 2,792,650 | 5/1957 | Kenyon . |
| 2,884,720 | 5/1959 | Meyer et al. . |
| 2,959,233 | 11/1960 | Scarlett et al. . |
| 2,979,839 | 4/1961 | Hugger . |
| 3,020,066 | 2/1962 | Torrey . |
| 3,091,352 | 5/1963 | Vitable . |
| 3,142,197 | 7/1964 | Tourneau . |
| 3,145,781 | 8/1964 | Rogler . |
| 3,151,885 | 10/1964 | Johnson . |
| 3,160,965 | 12/1964 | Walker et al. . |
| 3,161,072 | 12/1964 | Tourneau . |
| 3,201,878 | 8/1965 | Markwardt . |
| 3,217,431 | 11/1965 | Heinzroth et al. . |
| 3,252,716 | 5/1966 | Gaterman . |
| 3,307,275 | 3/1967 | Simi . |
| 3,388,929 | 6/1968 | Miley . |
| 3,410,008 | 11/1968 | Standfuss . |
| 3,412,489 | 11/1968 | Klapprodt et al. . |
| 3,426,458 | 2/1969 | Spitzer ................ 37/42 |
| 3,432,946 | 3/1969 | Peitl ................ 37/42 |
| 3,432,947 | 3/1969 | Peitl ................ 37/42 |
| 3,432,949 | 3/1969 | Glesmann ................ 37/44 |
| 3,464,129 | 9/1969 | Bogenschutz ................ 37/50 |
| 3,466,766 | 9/1969 | Kahlbacher ................ 37/41 |
| 3,483,641 | 12/1969 | Hirt ................ 37/44 |
| 3,524,269 | 8/1970 | Jackoboice ................ 37/42 |
| 3,545,109 | 12/1970 | Boschung ................ 37/41 |
| 3,587,182 | 6/1971 | Hirt ................ 37/41 |
| 3,588,147 | 6/1971 | Enters ................ 280/481 |
| 3,605,906 | 9/1971 | Coates ................ 172/272 |
| 3,640,005 | 2/1972 | Chiarolanza et al. ................ 37/42 R |
| 3,650,054 | 3/1972 | Hanson ................ 37/42 VL |
| 3,659,362 | 5/1972 | Bell ................ 37/42 R |
| 3,706,144 | 12/1972 | Miceli ................ 37/42 |
| 3,720,010 | 3/1973 | Coates ................ 37/42 R |
| 3,746,368 | 7/1973 | Gledhill et al. ................ 280/481 |
| 3,793,752 | 2/1974 | Snyder ................ 37/42 R |
| 3,800,882 | 4/1974 | Werts et al. ................ 172/273 |
| 3,828,449 | 8/1974 | Miceli ................ 37/41 |
| 3,844,425 | 10/1974 | Bailey ................ 214/131 A |
| 3,845,577 | 11/1974 | Naymik ................ 37/42 VL |
| 3,851,894 | 12/1974 | St. Pierre ................ 284/460 R |
| 3,876,092 | 4/1975 | Macdonald ................ 214/145 |
| 3,952,431 | 4/1976 | Gledhill et al. ................ 37/41 |
| 3,987,562 | 10/1976 | Deen et al. ................ 37/42 R |
| 4,065,009 | 12/1977 | Old ................ 214/131 A |
| 4,074,448 | 2/1978 | Niemela ................ 37/41 |
| 4,127,951 | 12/1978 | Hatch ................ 37/44 |
| 4,178,011 | 12/1979 | Kirsch ................ 280/477 |
| 4,187,624 | 2/1980 | Blau ................ 37/42 R |
| 4,215,496 | 8/1980 | Wehr ................ 37/117.5 |
| 4,217,075 | 8/1980 | Frank ................ 414/686 |
| 4,236,329 | 12/1980 | Hetrick ................ 37/42 R |
| 4,238,895 | 12/1980 | Hetrick ................ 37/41 |
| 4,275,984 | 6/1981 | Lenertz ................ 414/686 |
| 4,279,084 | 7/1981 | Low et al. ................ 37/42 R |
| 4,304,056 | 12/1981 | Watson et al. ................ 37/41 |
| 4,304,057 | 12/1981 | Watson et al. ................ 37/42 R |
| 4,304,305 | 12/1981 | Bartel ................ 172/274 |
| 4,307,523 | 12/1981 | Reissinger et al. ................ 37/42 VL |
| 4,318,662 | 3/1982 | Erickson et al. ................ 415/686 |
| 4,342,163 | 8/1982 | Hoekstra ................ 37/231 |
| 4,347,031 | 8/1982 | Friesen et al. ................ 415/686 |
| 4,355,945 | 10/1982 | Pilch ................ 414/686 |
| 4,439,939 | 4/1984 | Blau ................ 37/231 |
| 4,528,762 | 7/1985 | Sarka et al. ................ 37/234 |
| 4,554,978 | 11/1985 | Schneider ................ 172/247 |
| 4,619,060 | 10/1986 | Knowlton ................ 37/231 |
| 4,637,772 | 1/1987 | Stumpe ................ 415/686 |
| 4,658,519 | 4/1987 | Quenzi ................ 37/23 |
| 4,717,166 | 1/1988 | Vachon ................ 280/481 |
| 4,747,612 | 5/1988 | Kuhn ................ 280/460 |
| 4,778,195 | 10/1988 | Vachon ................ 280/477 |
| 4,817,728 | 4/1989 | Schmid et al. ................ 172/273 |
| 4,821,435 | 4/1989 | Pester ................ 37/231 |
| 4,919,212 | 4/1990 | McClure ................ 172/274 |
| 4,962,598 | 10/1990 | Woolhiser et al. ................ 37/231 |
| 4,962,599 | 10/1990 | Harris ................ 37/266 |
| 4,976,053 | 12/1990 | Caley ................ 37/231 |
| 4,991,323 | 2/1991 | Benkler ................ 37/235 |
| 4,993,677 | 2/1991 | Patterson ................ 248/351 |
| 4,999,935 | 3/1991 | Simi et al. ................ 37/236 |
| 5,027,536 | 7/1991 | Farrell ................ 37/236 |
| 5,036,608 | 8/1991 | Ciula ................ 37/236 |
| 5,050,321 | 9/1991 | Evans ................ 37/232 |
| 5,075,988 | 12/1991 | Ciula ................ 37/231 |
| 5,081,775 | 1/1992 | Veilleux ................ 37/197 |
| 5,094,019 | 3/1992 | DeVincenzo ................ 37/197 |
| 5,111,603 | 5/1992 | Knowlton et al. ................ 37/231 |
| 5,121,562 | 6/1992 | Feller ................ 37/235 |
| 5,136,795 | 8/1992 | Rosenberg ................ 37/233 |
| 5,142,801 | 9/1992 | Feller ................ 37/235 |
| 5,155,929 | 10/1992 | Vachon ................ 37/266 |
| 5,193,296 | 3/1993 | Reilley ................ 37/231 |
| 5,195,261 | 3/1993 | Vachon ................ 37/231 |
| 5,275,314 | 1/1994 | Todenhagen ................ 224/42.01 |
| 5,291,954 | 3/1994 | Kirwan ................ 172/311 |
| 5,353,530 | 10/1994 | Pieper ................ 37/231 |
| 5,451,080 | 9/1995 | Kneile ................ 248/354.1 |
| 5,485,690 | 1/1996 | MacQueen ................ 37/271 |
| 5,497,969 | 3/1996 | Broughton ................ 248/351 |
| 5,568,694 | 10/1996 | Capra et al. ................ 37/231 |
| 5,638,618 | 6/1997 | Niemela et al. ................ 37/281 |
| 5,647,153 | 7/1997 | Gervais ................ 37/231 |
| 5,806,213 | 9/1998 | Doornek et al. ................ 37/231 |
| 5,806,214 | 9/1998 | Behrens et al. ................ 37/231 |
| 5,815,956 | 10/1998 | Lavin et al. ................ 36/241 |
| 5,829,174 | 11/1998 | Hadler et al. ................ 37/234 |
| 5,832,637 | 11/1998 | Aguado et al. ................ 37/234 |
| 5,894,688 | 4/1999 | Struck et al. . |
| 6,012,240 | * 1/2000 | Klug et al. ................ 37/231 |

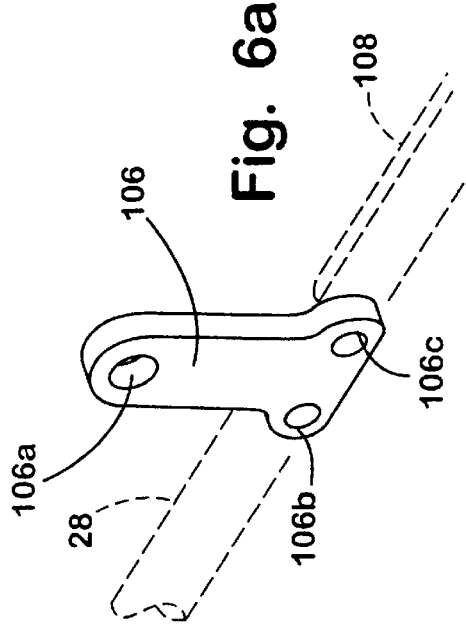
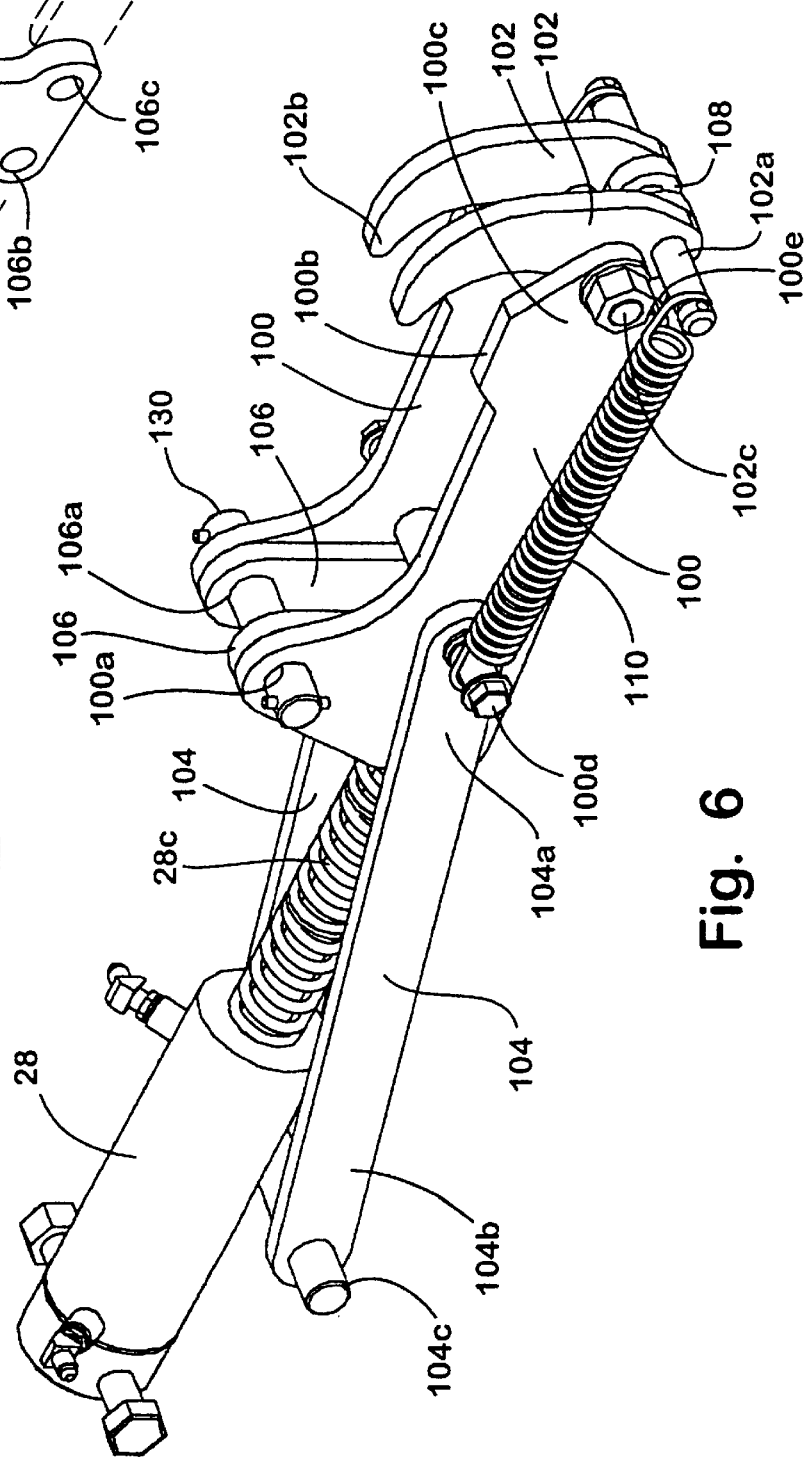

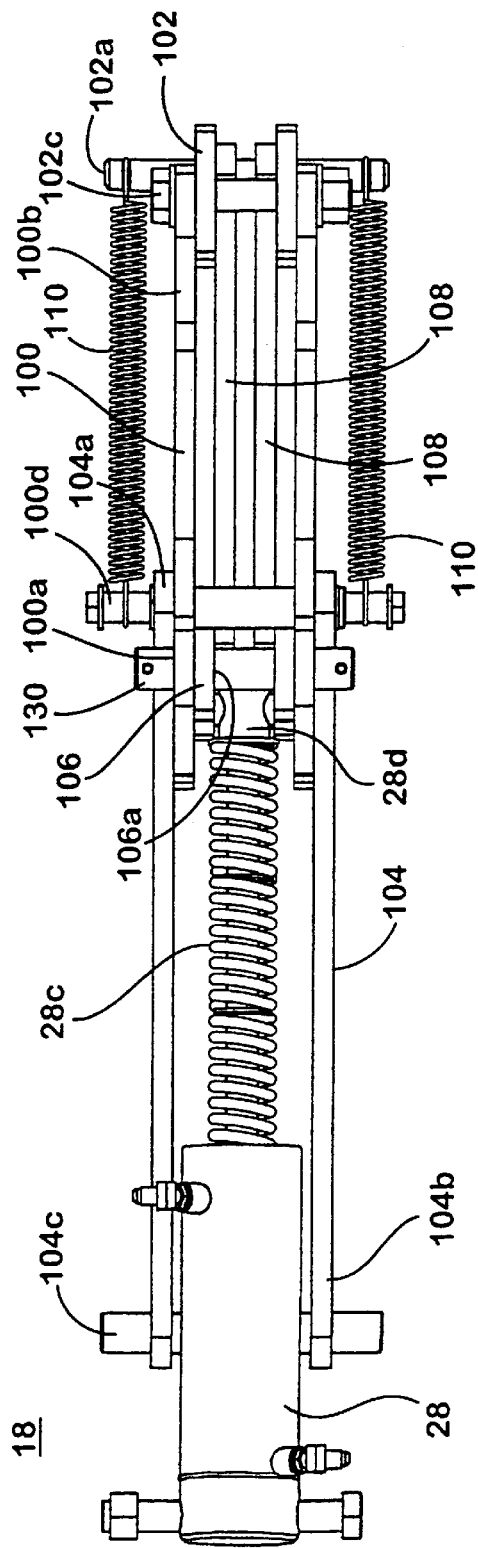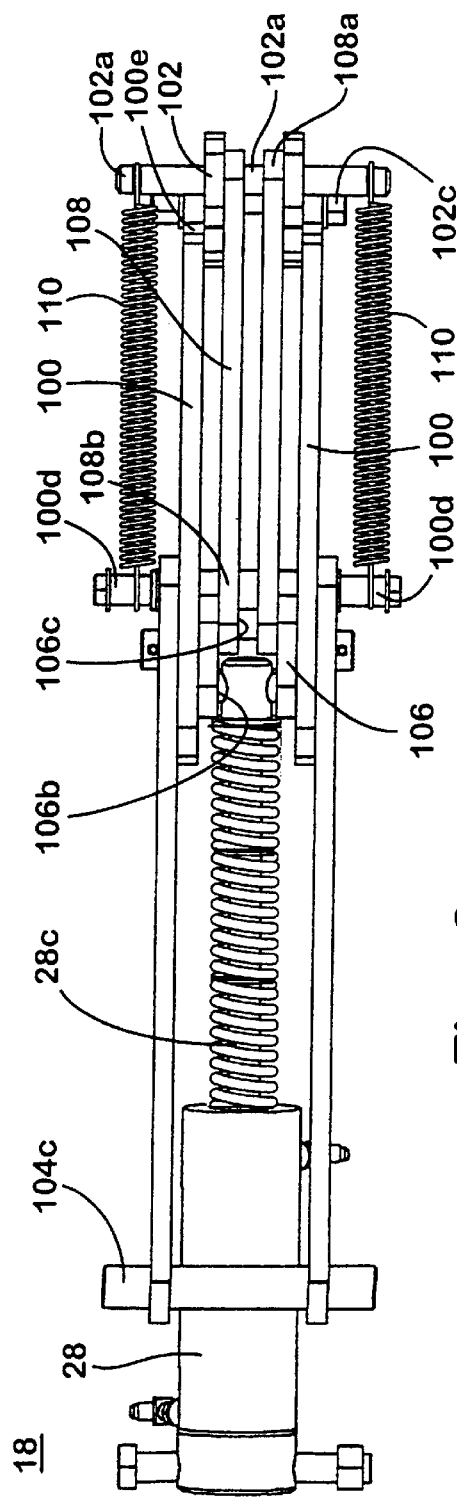

PLOW HITCH ASSEMBLY FOR VEHICLES

BACKGROUND OF THE INVENTION

This invention relates generally to plow assemblies for attachment to a vehicle, and, more particularly, to a plow hitch assembly for easy mounting and removal of a plow to and from the front of a vehicle.

A plow assembly for plowing snow or other loose or plastic materials such as sand, gravel, dirt of the like with a vehicle is typically mounted to the front end of the vehicle to push the snow as the vehicle is driven forward. A mounting assembly is fixedly secured to a frame or chassis of the vehicle in order to provide a plurality of mounting attachments for a plow and hitch assembly to secure thereto. These mounting assemblies are generally positioned beneath a front bumper of the vehicle with attachment brackets extending forwardly and upwardly to facilitate attachment. In order to move the vehicle when the plow is not in use, as well as to effectively push snow into a pile, a power source such as a hydraulic cylinder or the like is typically implemented to allow the plow blade of the plow assembly to be raised. This further requires that the hitch assembly and/or a lift assembly be pivotally secured to the mounting brackets extending from the vehicle.

When a typical plow assembly is to be attached to a vehicle having a corresponding mounting assembly secured thereto, the vehicle must be driven to a point substantially close to the mounting edge of the lift assembly of the plow assembly. At that point a person must manually adjust the lift assembly both vertically and horizontally in order to align the mounting holes or other attaching points on the lift assembly to the corresponding mounting holes or attaching points on the mounting assembly secured to the vehicle. Once the mounting holes are properly aligned, the same person, or a second person, must insert mounting pins through the mounting holes in order to secure the plow assembly to the vehicle. This may be a rather difficult process, as these plow assemblies are of substantial weight and may even include a light tower, which provides headlamps substantially above the blade of the plow, and a power source on the lift assembly, thereby substantially adding to the overall weight of the assembly which the person must then lift and move to align with the vehicle.

Because the vehicles on which these plow assemblies are attached are not always used to plow snow, such as every day transportation in the absence of snow, the plow assemblies are typically manually detachable from the mounting assembly, which remains on the vehicle. However, even when such assemblies are detached from the vehicle, the brackets and other connection points of many mounting assemblies protrude forward and above the bumper of the vehicle. This results in an unsightly appearance of the vehicle and may further lead to damage of the mounting attachments as they may become bumped or otherwise damaged over the time period when the plow assembly is not attached to the vehicle.

While some plow assemblies have addressed this concern by implementing a mounting assembly which remains substantially rearward of the bumper of the vehicle when the remainder of the plow assembly has been detached therefrom, it is then a difficult process to attach and detach the lift assembly of the plow onto the mounting assembly, since the mounting attachments are more difficult to reach due to their location beneath and rearward of the bumper. Therefore, this mounting process typically requires persons attaching the plow to the vehicle to be in a rather awkward and uncomfortable position as they attempt to reach the mounting holes beneath the bumper and insert the mounting pins therethrough while simultaneously supporting the lift assembly such that the holes are aligned. Similar difficulties are encountered when detaching the plow assembly from the mounting assembly on the vehicle.

Therefore, there is a need in the art for a snowplow assembly which provides for easy mounting and connecting of the plow assembly to the vehicle. The plow assembly must substantially detach from the vehicle such that a minimal number of components or brackets remain on the vehicle when the plow is not in use. The mounting attachments which are secured to the vehicle should not be visible along the front or sides of the vehicle such that they will avoid damage or injury to people when they are not in use. Furthermore, the plow assembly must be pivotally attached to the front of the vehicle without requiring a great deal of lifting and adjusting of the assembly by a person mounting the plow to a vehicle.

SUMMARY OF THE INVENTION

The present invention is intended to provide a plow assembly which is easily mounted to or detached from a vehicle, and especially the front of a vehicle, with a minimal requirement for manual exertion.

According to a first aspect of the invention, a plow hitch assembly is adapted for mounting a plow on a vehicle which has a frame and a bumper. A push beam assembly is secured to the frame of the vehicle and the hitch assembly comprises a lift arm assembly, a draw latch assembly and a power source. The lift arm assembly has a first and second end, where the first end is adapted for connection with a plow blade and the second end is adapted to removably and pivotally connect to the push beam assembly. The draw latch assembly selectively pulls the lift arm assembly toward the push beam assembly and pivots the lift arm assembly relative to the push beam assembly to vertically move the plow blade. The power source is interconnected with the lift arm assembly and the draw latch assembly and is operable to at least partially move a portion of the draw latch assembly such that the draw latch assembly engages the push beam assembly and pulls the lift arm assembly toward the push beam assembly. The power source is further operable to at least partially pivot the lift arm assembly relative to the push beam assembly and at least a portion of the draw latch assembly so as to vertically move the plow blade.

According to another aspect of the present invention, a hitch assembly is adapted for mounting a plow on a vehicle which has a frame and a bumper. The hitch assembly comprises a push beam assembly, a lift arm assembly, at least two coaxial mounting pins and a mounting lever. The push beam assembly is adapted to attach to the frame of the vehicle and includes at least two first mounting flanges extending outwardly therefrom at spaced positions. Each of these mounting flanges has a first mounting opening therethrough. The lift arm assembly has a first end and a second end, where the first end is adapted for connection with a plow blade and the second end is adapted to removably and pivotally connect to the push beam assembly. The second end of the lift arm assembly includes at least two second mounting flanges, each of which has a second mounting opening therethrough. The at least two mounting pins pivotally attach the lift arm assembly to the push beam assembly such that the lift arm assembly pivots relative to the push beam assembly about a first pivot axis defined by the mounting pins. Each of the mounting pins is at least initially positioned adjacent to one of the first and second mounting openings and removably insertable through a corresponding pair of the first and second mounting openings of the push beam assembly and the lift arm assembly when the first mounting openings are aligned with the second mounting openings. Preferably, a mounting lever is also included which is pivotable about a lever axis in a first direction and a second, opposite direction. The mounting lever is interconnected with the at least two mounting pins such that the mounting pins engage the second mounting openings of the lift arm assembly and the first mounting openings of the push beam assembly to pivotally secure the lift arm assembly to the push beam assembly in response to a rotational movement of the mounting lever in the first direction. The mounting pins are withdrawn from at least one of the first and second mounting openings to detach the lift arm assembly from the push beam assembly in response to a rotational movement of the mounting lever in the second direction.

According to yet another aspect of the present invention, a plow connection assembly is adapted for mounting a plow on a vehicle which has a frame and a bumper. The plow connection assembly comprises a push beam assembly, a lift arm assembly and a draw latch assembly. The push beam assembly is secured to the frame of the vehicle and is positioned substantially rearward of the bumper of the vehicle. The lift arm assembly has a first and second end. The first end of the lift arm assembly is adapted for connection with a plow blade and the second end is adapted to removably and movably connect to the push beam assembly. The draw latch assembly is pivotally interconnected with the lift arm assembly and extends from the second end of the lift arm assembly. The draw latch assembly is operable to pivot relative to the lift arm assembly to engage the push beam assembly and pull the lift arm assembly toward the push beam assembly for connection thereto.

These and other objects, advantages, purposes and features of this invention will become apparent upon review of the following specification in conjunction with the drawings.

BRIEF DESCRIPTION OF THE DRAWINGS

FIG. 4a is an upper rear perspective view of the kickstand assembly and a lift stop arm of the lift arm assembly of FIG. 4;

FIG. 6 is an upper rear perspective view of the draw latch assembly of the present invention;

FIG. 6a is an upper rear perspective view of an intermediate link of the draw latch assembly of FIG. 6;

FIG. 7 is a top plan view of the draw latch assembly of FIG. 6;

FIG. 8 is a bottom plan view of the draw latch assembly of FIG. 6;

DESCRIPTION OF THE PREFERRED EMBODIMENTS

Figure 1:
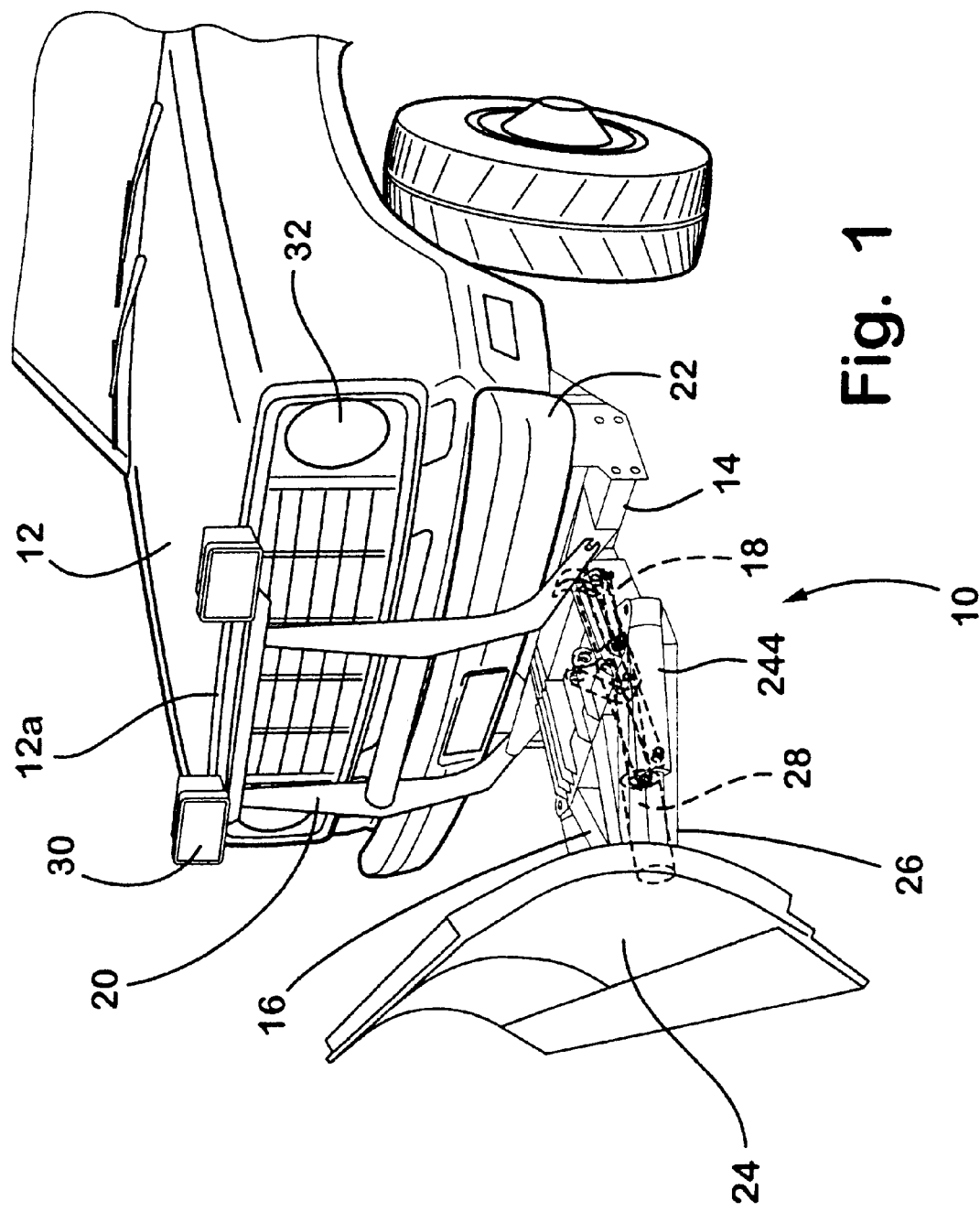
FIG. 1 is a perspective view of a plow and hitch assembly attached to the front of a vehicle in accordance with the present invention.

Referring now specifically to the drawings, and the illustrative embodiments depicted therein, there is shown in FIG. 1 a hitch assembly 10 attached to a vehicle 12, which may be a pickup truck, sport utility vehicle, 4×4 vehicle, or any other vehicle capable of pushing snow or the like with a plow. The plow assembly 10 may be attached to a front 12a or rear (not shown) of vehicle and comprises a mounting assembly or push beam assembly 14, a lift arm assembly 16, a draw latch assembly 18 and a light tower assembly 20. The push beam assembly 14 is adaptable to fixedly mount to a frame or chassis (not shown) of vehicle 12 and is preferably positioned such that it is positioned entirely beneath and rearward of a front bumper 22 of vehicle 12. Lift arm assembly 16 may include a plow blade 24 pivotally mounted at a forward end 26, and is pivotally attached to push beam assembly 14 about a generally horizontal axis such that plow blade 24 may be raised or lowered vertically by a power source or hydraulic cylinder 28. Draw latch assembly 18 is pivotally secured to lift arm assembly 16 and is operable to engage push beam assembly 14 when lift arm assembly 16 is not pivotally attached to push beam assembly 14, and pull lift arm assembly 16 into position for mounting. Hydraulic cylinder 28 is interconnected between front end 26 of lift arm assembly 16 and draw latch assembly 18, so as to be selectively operable to pull lift arm assembly 16 into alignment with push beam assembly 14 and is further operable to raise or lower lift arm assembly 16 and plow blade 24, as discussed in detail below. Light tower assembly 20 includes a pair of headlamps 30 which provide light over top of plow blade 24 as plow blade 24 generally interferes with standard headlamps 32 of vehicle 12, especially when raised.

Lift arm assembly 16 and draw latch assembly 18 are easily attached as a unit to push beam assembly 14, since draw latch assembly 18 is operable to pull lift arm assembly 16 into alignment with push beam assembly 14, thereby avoiding excessive manual moving or lifting of lift arm assembly 16. Preferably, push beam assembly 14 is substantially below and rearward of bumper 22 of vehicle 12, such that when draw latch assembly 18 and lift arm assembly 16 are detached from push beam assembly 14, there are no brackets or other connection points visible on vehicle 12. Light tower assembly 20 is also removably mounted to push beam assembly 14 and may easily be removed therefrom when not in use.

PUSH BEAM ASSEMBLY

Figure 2:
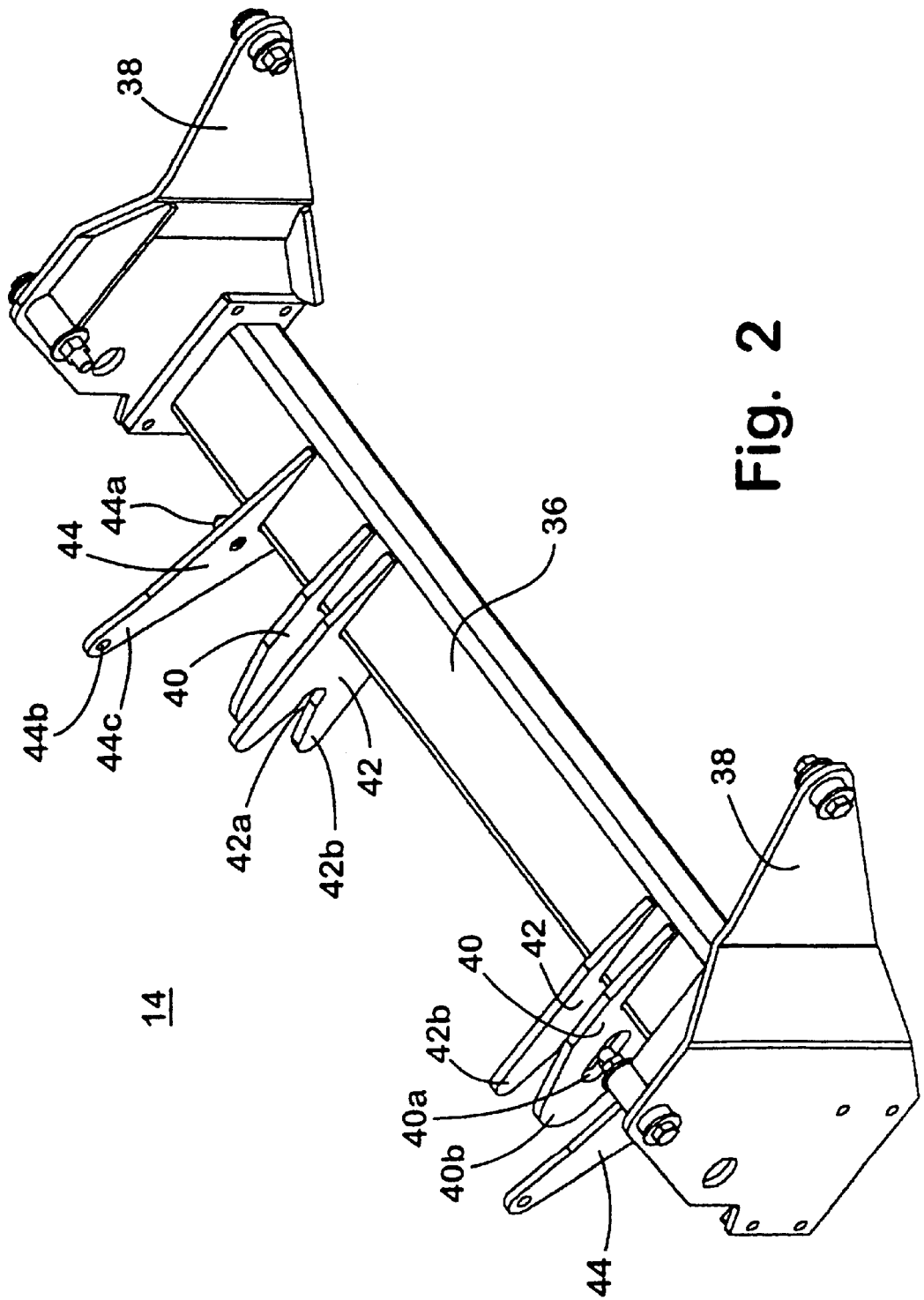
FIG. 2 is an upper rear perspective view of the push beam assembly of the present invention adapted for attachment to the frame or chassis of a vehicle.
Figure 3:
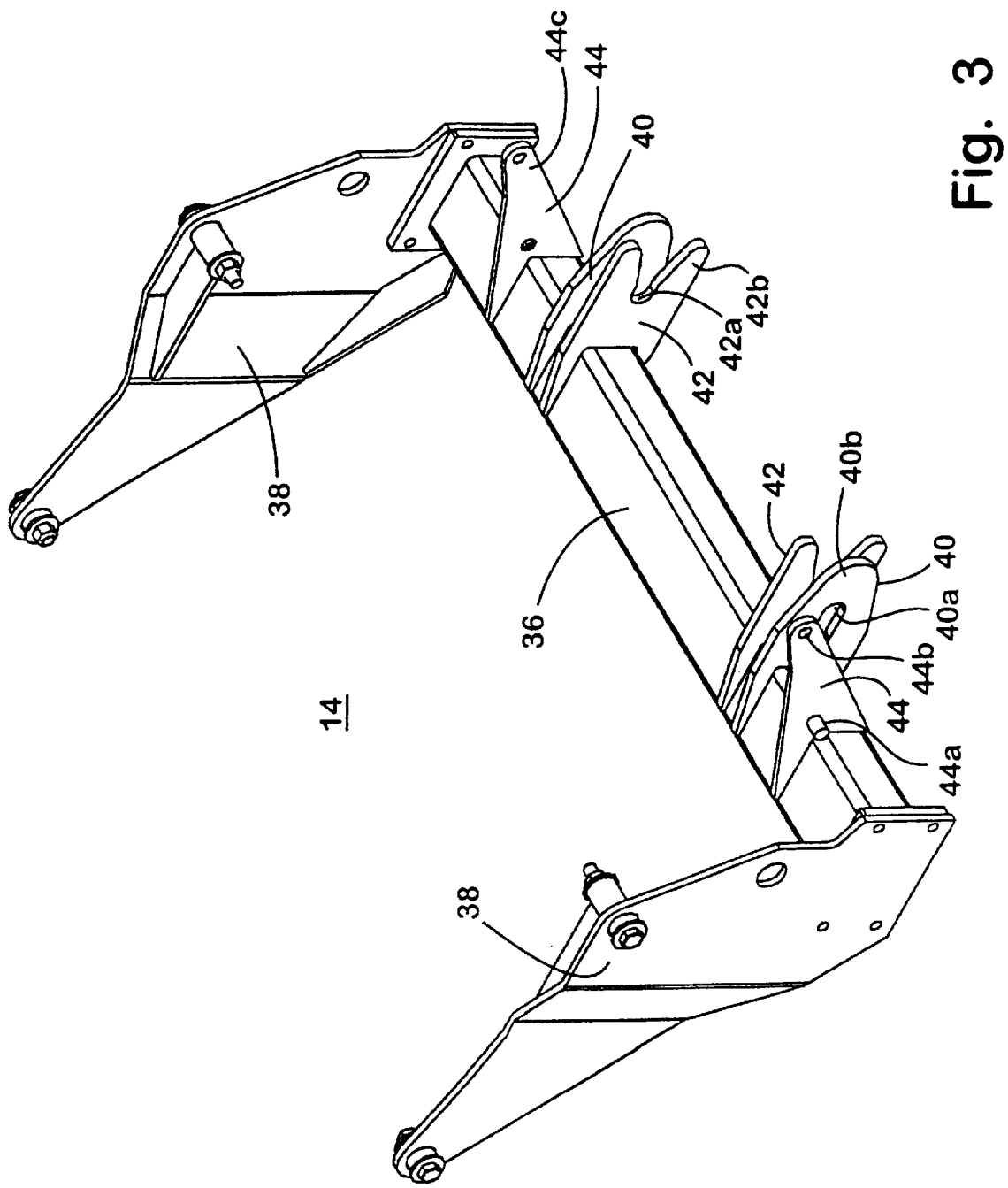
FIG. 3 is an upper front perspective view of the push beam assembly of FIG. 2.

Referring now to FIGS. 2 and 3, push beam assembly 14 comprises a substantially horizontal beam 36 extending laterally between two substantially vertical vehicle mounting plates 38 and welded, bolted or otherwise secured therebetween. Vehicle mounting plates 38 are bolted or otherwise secured to the frame or chassis of vehicle 12 and will not be described in great detail, as they are adaptable for attaching push beam assembly 14 to an appropriate vehicle, and thus may vary according to the vehicle on which they are to be mounted. Extending forwardly along push beam 36 are at least two mounting extensions or brackets 40 laterally spaced apart along push beam 36. Mounting brackets 40 extend substantially forwardly of push beam 36 and include a closed mounting hole or slotted opening 40a at a forward end 40b of mounting brackets 40. The mounting hole 40a is preferably slotted to facilitate alignment of mounting hole 40a with a corresponding mounting hole on lift arm assembly as discussed below. A guide bracket 42 is positioned laterally to one side of each mounting bracket 40 and also extends forwardly of push beam 36. Guide brackets 42 include a slotted opening 42a toward their forward end 42b. Slotted opening 42a widens toward forward end 42b to form a substantially V-shaped opening in guide bracket 42. A pair of laterally spaced light support brackets 44 are also attached to push beam 36 and extend forwardly and upwardly therefrom. Each light support bracket 44 includes a laterally extending pin 44a positioned near push beam 36 and a substantially cylindrical hole or passageway 44b through a distal end 44c of light bracket 44 which is spaced from push beam 36. Mounting bracket 40, guide bracket 42 and light bracket 44 may be welded, bolted or otherwise secured to push beam 36 and extend generally forwardly therefrom yet preferably do not extend beyond bumper 22 of vehicle 12 when push beam assembly 14 is installed to vehicle 12. Preferably, light brackets 44 are positioned laterally outwardly from mounting bracket 40 and guide bracket 42. Mounting bracket 40 is positioned substantially near guide bracket 42 and is also preferably positioned laterally outward from guide bracket 42, as shown in FIGS. 2 and 3.

LIFT ARM ASSEMBLY

Figure 4:
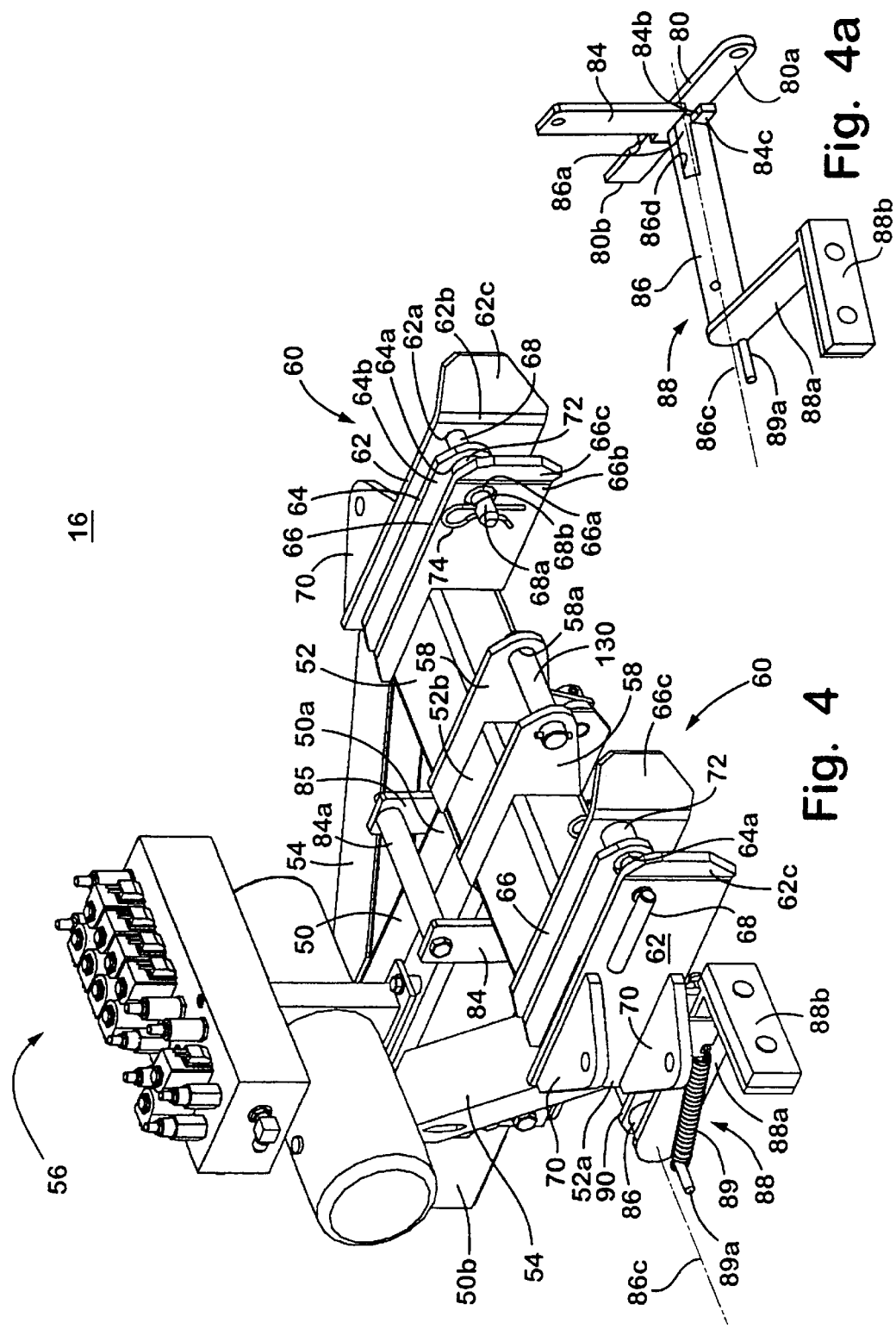
FIG. 4 is an upper rear perspective view of a lift arm assembly of the present invention.
Figure 5:
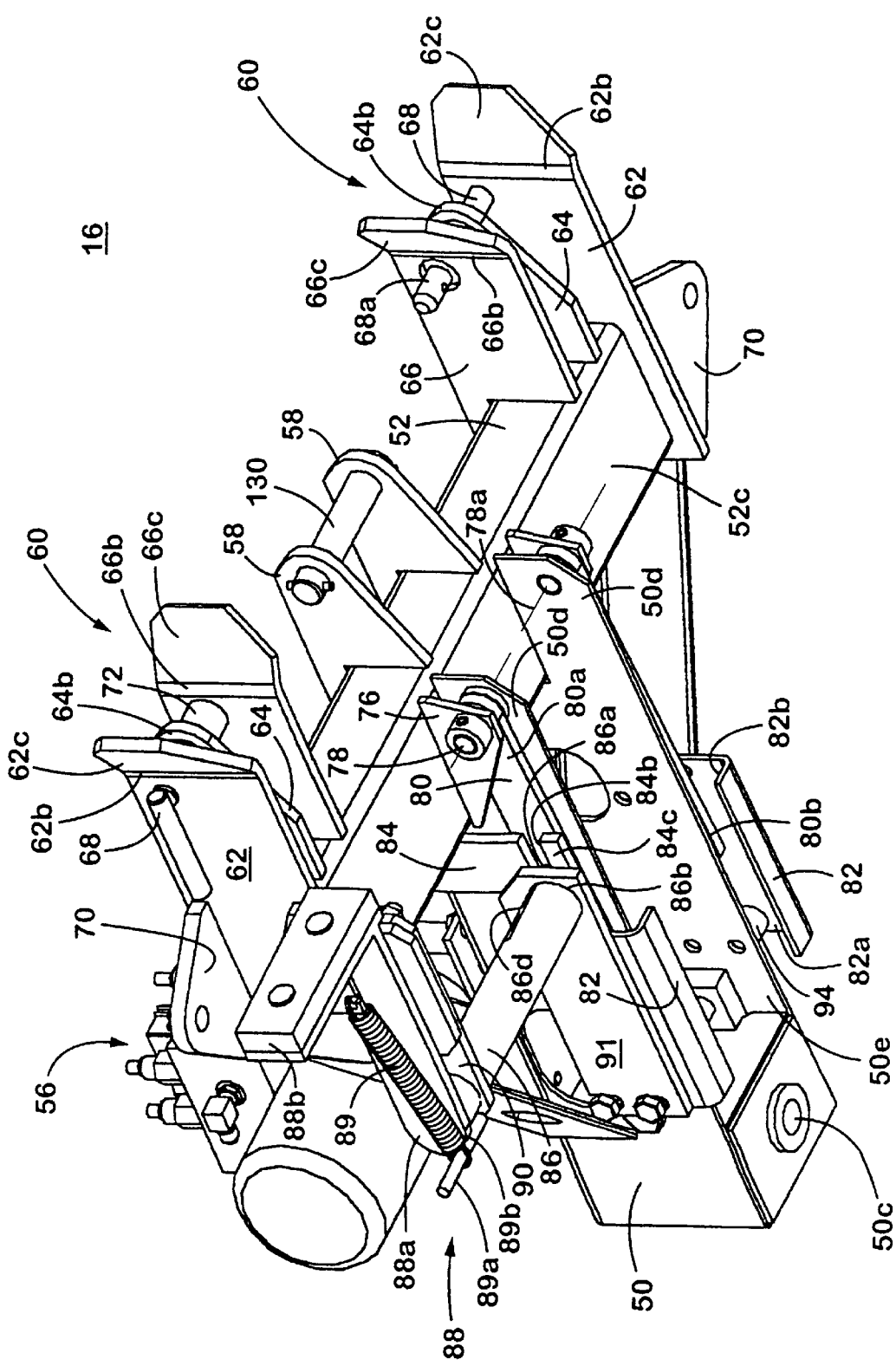
FIG. 5 is an underside rear perspective view of the lift arm assembly of FIG. 4.

Referring now to FIGS. 4 and 5, lift arm assembly 16 is generally triangular or A-shaped with a center lengthwise beam 50 connected to a laterally extending cross beam 52 at a rearward end 50a of center beam 50. A pair of support arms 54 extend from each end 52a of cross beam 52 to a forward end 50b of center beam 50 to provide stability and support to lift arm assembly 16. Forward end 50b of center beam 50 further includes a substantially cylindrical passageway 50c (FIG. 5) extending substantially vertically therethrough. Passageway 50c is for pivotally connecting plow blade 24 (FIG. 1) to lift arm assembly 16. Plow blade 24 may be secured by a pin (not shown) extending through a bracket or collar on a rearward portion of plow blade 24 through passageway 50c, such that the pin provides a vertical pivot axis about which plow blade 24 pivots from side to side. This sideways pivoting is preferably accomplished by a pair of hydraulic cylinders 244 (FIGS. 1 and 20), each one being preferably pivotally secured between a set of mounting brackets 70 extending laterally outward from each end 52a of cross beam 52 and a pair of attachment brackets (not shown) on a rearward side of plow blade 24. A hydraulic pump 56 or other power source for activating hydraulic lift cylinders 244 and 28, and any other hydraulic cylinders which may be included in hitch assembly 10, is secured on an upper surface of center beam 50.

Extending rearwardly from a center portion 52b of cross beam 52 of lift arm assembly 16 are a pair of corresponding draw latch mounting brackets 58, spaced laterally apart and each with a mounting hole or opening 58a therethrough. A pin 130 may be provided in lift arm assembly 16 for pivotally mounting draw latch assembly 18 to brackets 58, as discussed below. Cross beam 52 further includes a set of push beam mounting brackets or flanges 60 positioned substantially near each lateral end 52a of cross beam 52. Each push beam mounting bracket 60 preferably comprises three rearwardly extending flanges or brackets, an outer mounting flange 62, an outer bushing support flange 64 and an inner bushing support flange 66. Each flange or bracket is generally parallel to and spaced apart from the other brackets. Outer mounting flange 62 preferably extends rearwardly of cross beam 52 and includes a mounting hole or opening 62a therethrough for receiving a mounting pin 68. At a rearward end 62b of each outer mounting flange 62, there is preferably an outwardly bent or flared section 62c, which extends rearwardly and laterally outwardly from rearward end 62b of outer mounting flange 62. Each outer mounting flange 62 is preferably positioned at ends 52a of cross beam 52. Positioned laterally inwardly from each outer mounting flange 62 is outer bushing support 64, which also extends rearwardly from cross beam 52 and includes a support hole or opening 64a through its rearward end 64b. Positioned inwardly from each outer bushing support 64 is a corresponding inner bushing support 66, which also extends rearwardly from cross beam 52 and includes a support hole or opening 66a through its rearward end 66b. Inner bushing support 66 further includes an inwardly bent or flared section 66c extending rearwardly and laterally inward from rearward end 66b. A guide bushing 72 is interconnected between support holes 64a and 66a through each outer bushing support 64 and inner bushing support 66, respectively. Guide bushings 72 are substantially cylindrical in shape and have a cylindrical hollow passageway (not shown) therethrough for receiving mounting pins 68 since holes 62a are substantially coaxially aligned with the passageway through guide bushings 72. Mounting pins 68 are preferably substantially L-shaped with a cylindrical portion 68a which is extendable through holes 62a, 64a and 66a in mounting brackets 62 and bushing supports 64 and 66, respectively. Mounting pins 68 may include a hole or opening 68b through one end for receiving a lock pin 74, or may have other means for preventing mounting pins 68 from being accidentally removed from the mounting brackets.

As best shown in FIG. 5, center beam 50 includes a rearward projecting flange 50d along each side of center beam 50. Flanges 50d are positioned substantially adjacent to an underside surface 52c of cross beam 52, and spaced apart from a pair of corresponding downwardly depending brackets 76 extending from lower surface 52c of cross beam 52. Each bracket 76 and each extension 50d are positioned laterally apart with a corresponding pin 78 extending therethrough, to form a pivot axis 78a for a lift stop link 80. Each lift stop link 80 is a substantially rectangular shaped bar and is pivotally secured at one end 80a to lift arm assembly 16 by pin 78 and brackets 76 and 50d and extends forwardly therefrom such that a forward end 80b is within a channel 82a extending along each side of center beam 50. Channels 82a along center beam 50 are preferably formed by a pair of L-shaped brackets 82 extending lengthwise along each side of center beam 50 and curving inwardly at a lower edge 50e of center beam 50 to form a substantially horizontal track 82b. L-shaped brackets 82 are spaced outwardly from center beam 50 by at least two spacers 94, so as to provide a space in which lift stop link 80 is positioned between the brackets 82 and the sides of center beam 50.

Lift stop links 80 include a pair of connecting members 84 and 85, which are welded or otherwise secured to links 80 and extend substantially vertically from a corresponding lift stop link 80 on either side of center beam 50. Connecting members 84 and 85 are connected at an upper end by a connecting pin or rod 84a (FIG. 4), such that movement of one lift stop link 80 will cause substantially the same movement of the other lift stop link 80 on the opposite side of center beam 50. A generally horizontally extending slot 84b is formed along a lower end 84c of one of the vertical connecting members 84.

A kickstand or support assembly 88 (FIGS. 4, 4a and 5) is preferably positioned on one side of lift arm assembly 16 to support lift arm assembly 16 when lift arm assembly 16 is not pivotally connected to push beam assembly 14. Support assembly 88 includes a substantially L-shaped leg 88a with a foot 88b at one end and includes a shaft 86. Shaft 86 extends from leg 88a through an outer kickstand bracket 90 and an inner kickstand bracket 91 and is pivotally secured therethrough. A cylindrical extension 86a extends from an end 86b of shaft 86 and is positioned eccentrically from a longitudinal axis 86c of shaft 86. Cylindrical extension 86a, is preferably welded within a groove 86d formed along an outer portion of shaft 86 and extends inward of inner kickstand bracket 91 to engage slot 84b in connecting member 84, as best shown in FIG. 4a. Because cylindrical extension 86a is positioned off-axis along shaft 86, rotational movement of the kickstand leg 88a and foot 88b causes cylindrical extension 86a to move along an arcuate path about axis 86c. This results in a vertical movement of cylindrical extension 86a which further causes a corresponding vertical movement of connecting member 84 and thus a corresponding vertical movement of both lift stop links 80. Therefore, a rotational movement of kickstand support assembly 88 causes both lift stop links 80 to move vertically and thus pivot about pivot axis 78a. More specifically, cylindrical extension 86a is positioned along a lower portion of shaft 86 when support stand 88 is in a down or supporting position, such that when support stand 88 is pivoted into a raised position, as shown in FIG. 5, cylindrical extension 86a is rotated upwardly about the axis 86c of shaft 86. This results in lift restraint links 80 being raised as cylindrical extension 86a moves upwardly against vertical connecting member 84. A spring 89 and pin 89a may be included on outer kickstand bracket 90 and engage a notch 89b on leg 88a to provide resistance to pivotal movement of support assembly 88 to its support position, thereby securing support stand assembly 88 in its raised position.

DRAW LATCH ASSEMBLY

Referring now to FIGS. 6 through 8, draw latch assembly 18 comprises a pair of mounting links 100, a pair of draw links 102, a pair of lift stop arms 104, a pair of intermediate links 106 and a pair of connecting links 108. Draw links 102 are spaced laterally apart from one another and have a generally curved or hook-shaped portion 102b. A substantially horizontally extending connecting link pin 102a extends between the two draw links 102 and preferably extends laterally outwardly thereof. Connecting link pin 102a is positioned at a lower end of draw links 102 substantially opposite the hooked portions 102b and functions to provide a pivotal connection of connecting links 108, at a rearward end 108a, between draw links 102 and to further provide a connection for a pair of draw latch springs 110, as discussed below. Draw links 102 are pivotally secured between the rearward ends 100a of mounting links 100 about a bolt or pin 102c. Pin 102c is positioned through draw links 102 relative to connecting link pin 102a preferably such that rearward movement of connecting links 108 causes a rotation of draw links 102 about pin 102c such that the curved portions 102b of draw links 102 move generally forward relative to mounting link 100.

As shown in FIG. 6a, intermediate links 106 are generally triangular shaped and include three pivot holes or openings therethrough. An upper hole 106a is positioned in an upper portion of each intermediate links 106 and provides for a pivotal connection of intermediate links 106 to both mounting link arm 100 and lift arm assembly 16 by pin 130. A lower forwardly positioned hole 106b through each intermediate link 106 provides for a pivotal connection of hydraulic cylinder 28, while a lower rearward hole 106c provides for a pivotal connection to connecting links 108 at a forward end 108b of connecting links 108. Hydraulic cylinder 28 preferably includes at least one compression spring or a series of compression springs 28c positioned along a rod portion 28d (FIG. 7) of hydraulic cylinder 28 for biasing rod portion 28d in a partially extended position when hydraulic cylinder 28 is not pressurized. This biases mounting links 100 in an upward position, as discussed below. Connecting links 108 are substantially straight bar linkages which are thus pivotally interconnected at lower rearward holes 106c of intermediate links 106 and at lower pin 102a of draw links 102 and positioned between the two mounting links 100.

Mounting links 100 include an upwardly extending flange for pivotal connection to lift arm assembly 16, and include a substantially cylindrical hole or opening 100a therethrough. mounting links 100 extend generally rearwardly from openings 100a and include a substantially flattened section 100b along an upper edge toward their rearward end 100c. Flat region 100b provides for a contact point with an underside of push beam 36 when draw latch assembly 18 engages push beam 36, as discussed in detail below. Pivot pin 102c of draw links 102 pivotally connects draw links 102 to mounting links 100 at a location below and substantially rearward of flat sections 100b on mounting links 100. A recess or indentation 100e is preferably formed along a lower rearward edge of each mounting link 100 for receiving pins 102a on draw links 102 and preventing over-rotation of draw links 102 relative to mounting links 100. A spring retaining pin 100d extends generally through a center portion of mounting links 100 and further protrudes laterally outwardly therefrom. Spring retaining pin 100d functions to provide a connection point for draw latch spring 110 and further provides a pivotal connection for a pair of lift stop arms 104 at a rearward end 104a of lift stop arms 104. The stop arms 104 are generally straight bar linkages extending in a generally forward direction from second spring retaining pin 100d along outer side surface of each mounting link 100. Stop arms 104 are also connected to each other at their forward end 104b by a substantially cylindrical and horizontally extending slide pin at 104c. Slide pin 104c extends substantially horizontally between front ends 104b of lift stop arms 104 and further protrudes laterally outwardly therefrom. Slide pin 104c may also include a spacer positioned between the lift stop arms 104 to provide lateral support of lift stop arms 104. Preferably, a spacer is also included along pins 102a, 102c and 100d, to provide lateral support between the pair of mounting links 100 and pair of draw links 102.

As shown in FIGS. 4, 5, 10–17 and 22, intermediate links 106 are positioned between mounting links 100 and are pivotally connected to both the mounting links 100 and lift arm assembly 16 by insertion of pin 130 through holes 106a and 100a of intermediate links 106 and mounting links 100, respectively, and through holes 58a in bracket 58. As hydraulic cylinder 28 provides rearward motion of the lower portion of the intermediate links 106, through the pivotal interconnection with hole 106b, intermediate links 106 therefore pivot rearwardly about a pivot axis defined by opening 106a. This rearward motion of the lower portion of intermediate links 106 results in a rearward movement of connecting links 108, and a corresponding movement of the lower portions of draw links 102, thereby pivoting draw links 102 about pivot axis 102c at the rearward end of mounting links 100. Although shown and described as several linkages being pivoted by a hydraulic cylinder, clearly other means of moving linkages in order to pivot a draw link and/or a mounting link may be implemented without affecting the scope of the present invention.

Figure 9:
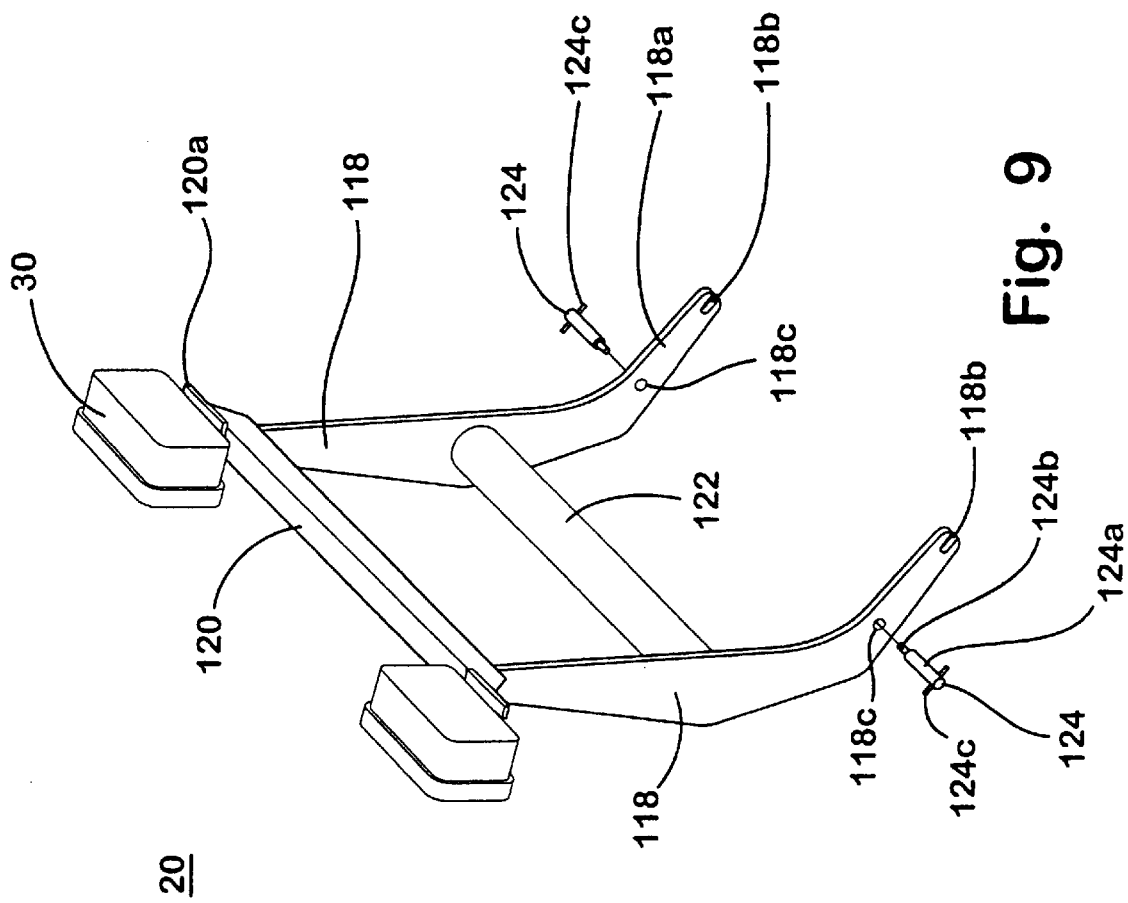
FIG. 9 is an upper rear perspective view of a light tower assembly of the present invention.

Referring now to FIG. 9, light tower assembly 20 generally comprises a pair of headlamps 30, a pair of substantially vertical and parallel side bars 118 and upper and lower cross members 120 and 122, respectively. Headlamps 30 are mounted to a pair of brackets 120a positioned at each end of upper cross member 120. Lower cross member 122 provides lateral support of vertical side bars 118 and is welded or otherwise secured between the two side bars 118 at a location substantially beneath upper cross member 120. Sidebars 118 are substantially vertical members and include a curved section 118a at their lower end. Curved section 118a further includes a slot 118b at its lower end and a hole or opening 118c that is positioned substantially above and forwardly of slot 118b. A pair of spring extendable mounting pins 124 may also be included, each of which preferably consists of an outer threaded portion 124a and an inner pin 124b, which is spring biased to an extended position. Inner pin 124b includes a tee handle 124c on a laterally outboard end which may be pulled outwardly to retract inner pin 124b into a retracted position within outer threaded portion 124a. Inner pins 124b may be rotatable when in this retracted position in order to temporarily secure them in the retracted position to facilitate attachment of light tower assembly 20 to push beam assembly 14. Mounting pins 124 are preferably threadably engaged or otherwise secured in holes 118c such that inner pins 124b are extendable therefrom and further engageable with the light tower mounting bracket 44 when light tower assembly 20 is aligned with the push beam assembly 14, as discussed in detail below.

Figure 10:
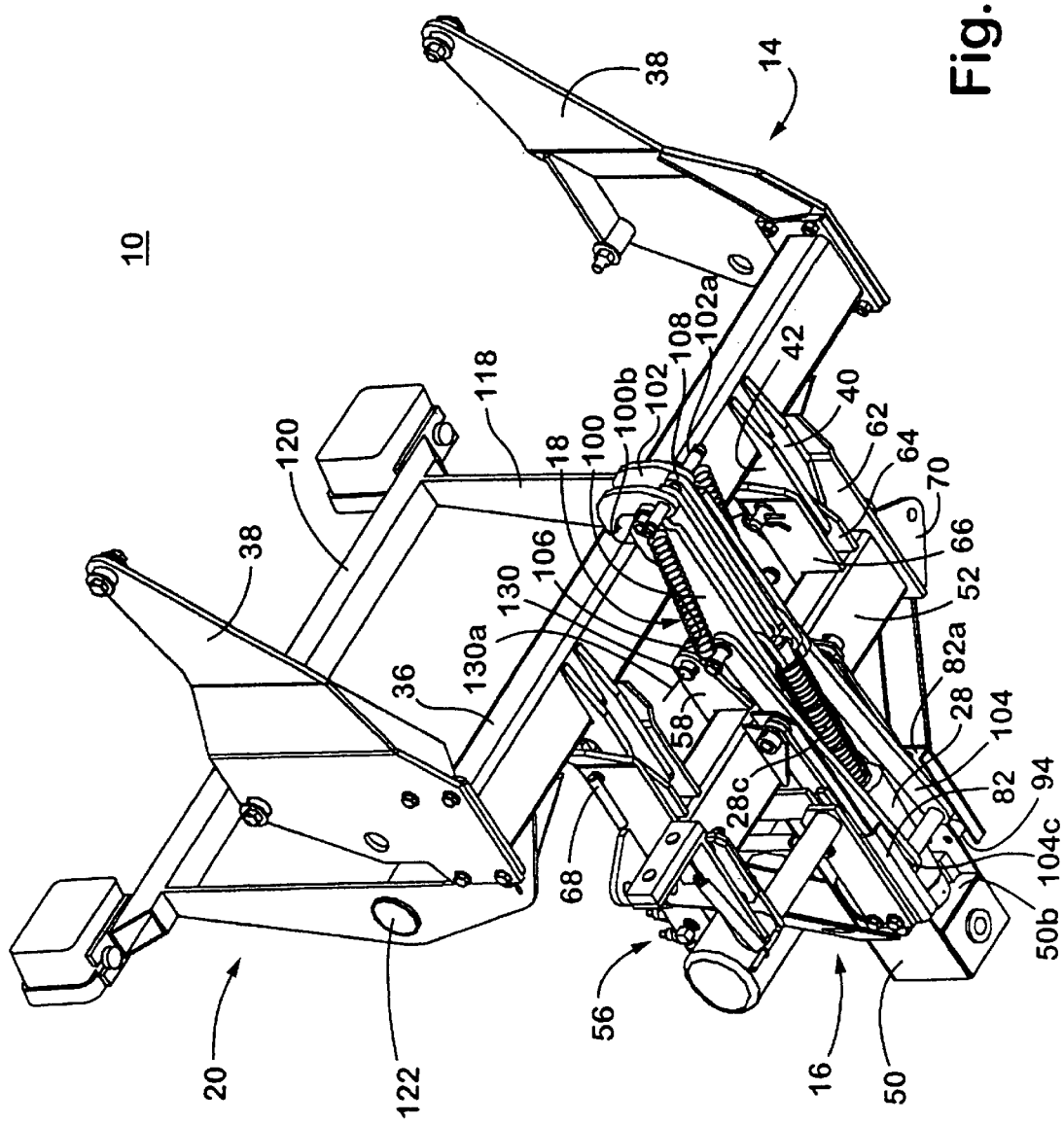
FIG. 10 is an underside rear perspective view of a plow and hitch assembly of the present invention.
Figure 11:
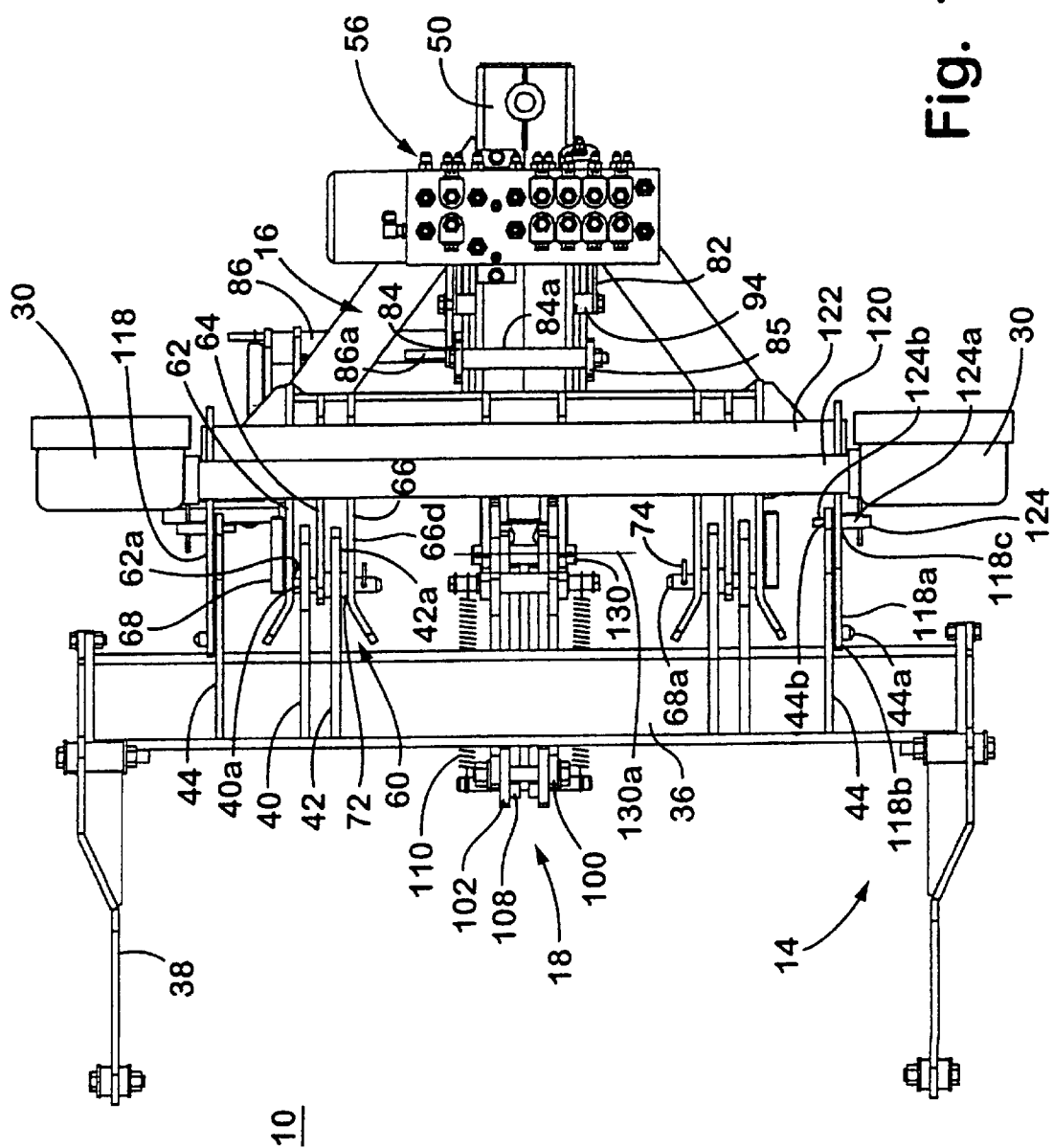
FIG. 11 is a top plan view of the plow and hitch assembly of FIG. 10.
Figure 12:
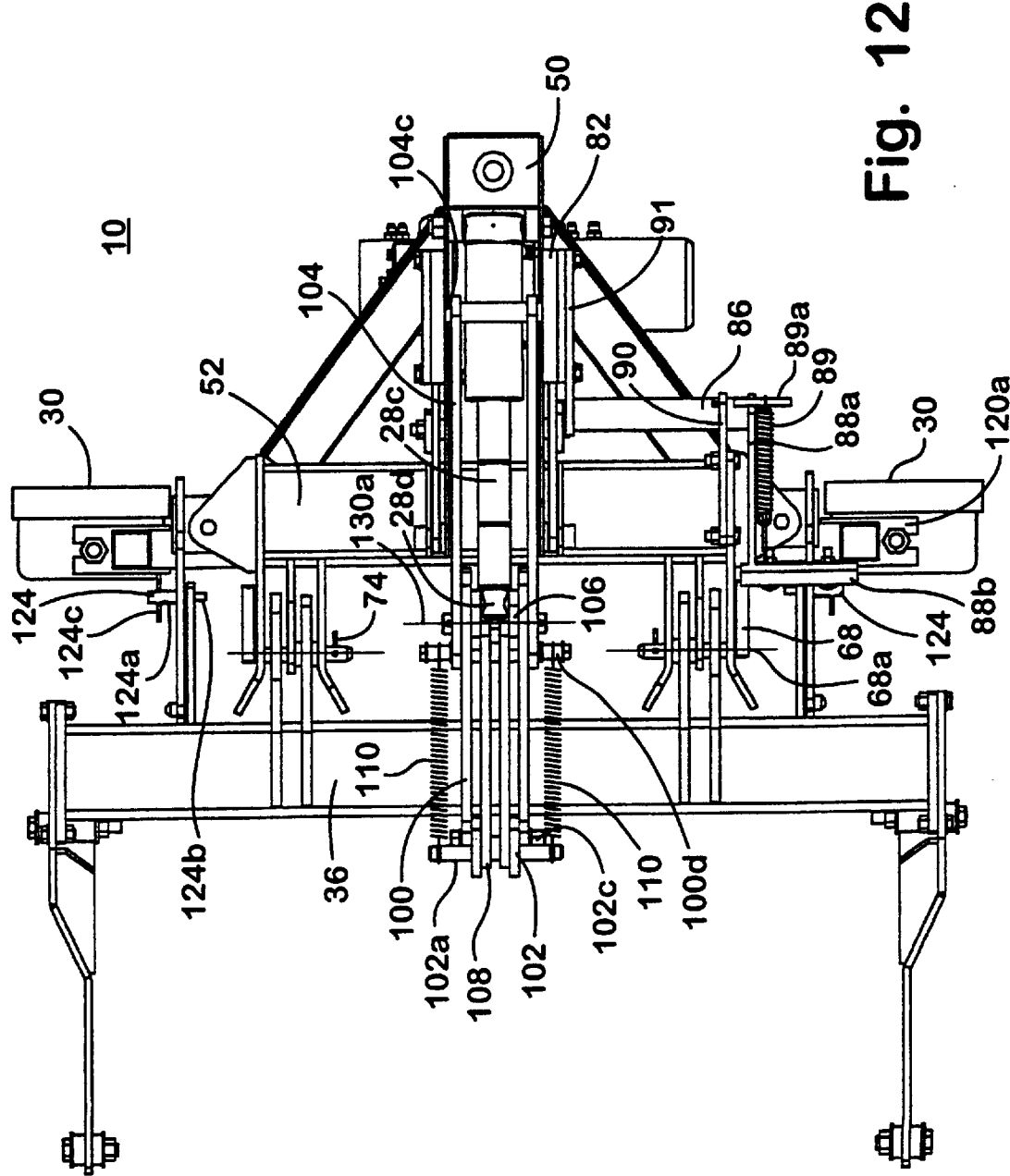
FIG. 12 is an underside plan view of the plow and hitch assembly of FIG. 10.

Referring now to FIGS. 10–12, hitch assembly 10 is shown in its fully assembled state, yet separate from a vehicle. Draw latch assembly 18 is pivotally connected to draw latch bracket 58 of lift arm assembly 16 by pin or bolt 130. Pin 130 extends through draw latch bracket 58, mounting links 100 and intermediate links 106, such that both intermediate links 106 and mounting links 100 are pivotable relative to lift arm assembly 16 and further pivotable relative to one another about a pivot axis 130a. Hydraulic cylinder 28 of draw latch assembly 18 is also pivotally secured to lift arm assembly 16 at a forward end 50b of center beam 50 of lift arm assembly 16. Therefore, activation of hydraulic cylinder 28 will cause rotational movement of intermediate links 106 or mounting links 100 or both relative to lift arm assembly 16. Slide pins 104c of lift stop arms 104 slide within the channel 82a formed by channel plates 82 and spacers 94 connected to the sides of center beam 50 of lift arm assembly 16. As discussed above, lift stop links 80 are also positioned such that forward end 80b of stop links 80 is within the channels 82a and positioned laterally outwardly from the sidewall of center beam 50. Lift stop links 80 pivot about pivot pins 78 such that in a lowered position, corresponding to a lowered or support position of the kickstand or support assembly 88, rearward movement of slide pins 104c along channel 82a is limited as the outward portions of slide pins 104c engage the end 80b of lift restraint links 80 when slide pins 104c are moved rearwardly along channel 82a. As discussed further below, when rearward movement of slide pins 104c is limited, lift stop arms 104 prevent further pivoting of mounting links 100, which results in pivoting of only intermediate links 106 and therefore draw links 102 upon any further rearward movement on the part of hydraulic cylinder 28.

As best shown in FIGS. 11 and 12, lift arm assembly 16 is pivotally secured to push beam assembly 14 by pivot pins 68 engaging the push beam mounting brackets 60 of lift arm assembly 16 when they are aligned with the lift arm assembly mounting brackets 40 of push beam assembly 14. More specifically, when slots 42a of guide brackets 42 on push beam assembly 14 engage guide bushings 72 positioned between inner and outer bushing supports 66 and 64, pivot holes 40a of lift arm assembly mounting brackets 40 are vertically adjusted so as to align with corresponding pivot holes 62a on outer mounting flanges 62 of lift arm assembly 16 and with the passageways through guide bushings 72. Pivot pins 68 are then inserted through the holes 62a and 40a, and further inserted through guide bushings 72 and the corresponding bushing supports 64 and 66, such that each pin 68 protrudes through an inner side 66d of each inner bushing support 66. Lock pins 74, or other means of preventing pivot pins 68 from being removed from the mounting brackets, are then inserted through or otherwise secured to the inwardly protruding portions of pivot pins 68.

Figure 17:
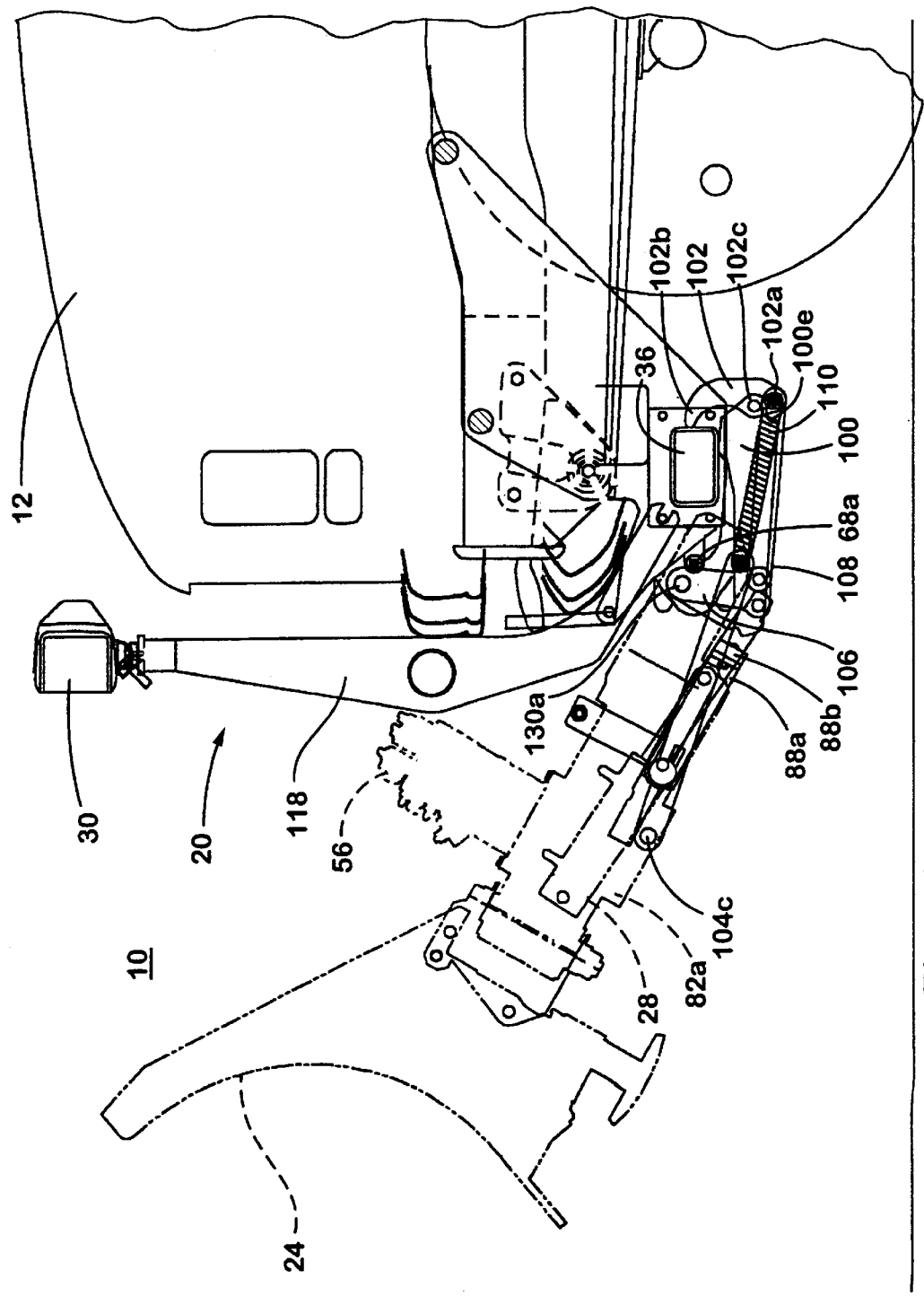
FIG. 17 is a side view of the plow and hitch assembly of FIG. 13 with the plow and lift arm assembly shown in a raised position.

Lift arm assembly 16 is therefore pivotally secured about the pivot pins 68 connecting lift arm assembly 16 to push beam assembly 14. The pivot pins 68 are substantially coaxially aligned, such that a single pivot axis 68a is formed by this connection. However, due to the additional pivot axis 130a defined by pin 130 connecting mounting links 100 and intermediate links 106 to brackets 58 of lift arm assembly 16, a second pivot axis 130a is provided that is not coaxially aligned with the pivot axis formed by pivot pins 68. As best seen in FIG. 11, pivot axis 130a is spaced substantially forwardly of the pivot axis 68a formed by the pivot pin 68 and, as best seen in FIG. 17, pivots upwardly about pivot axis 68a while lift arms assembly 16 pivots relative to both push beam assembly 14 and draw latch assembly 18.

Figure 13:
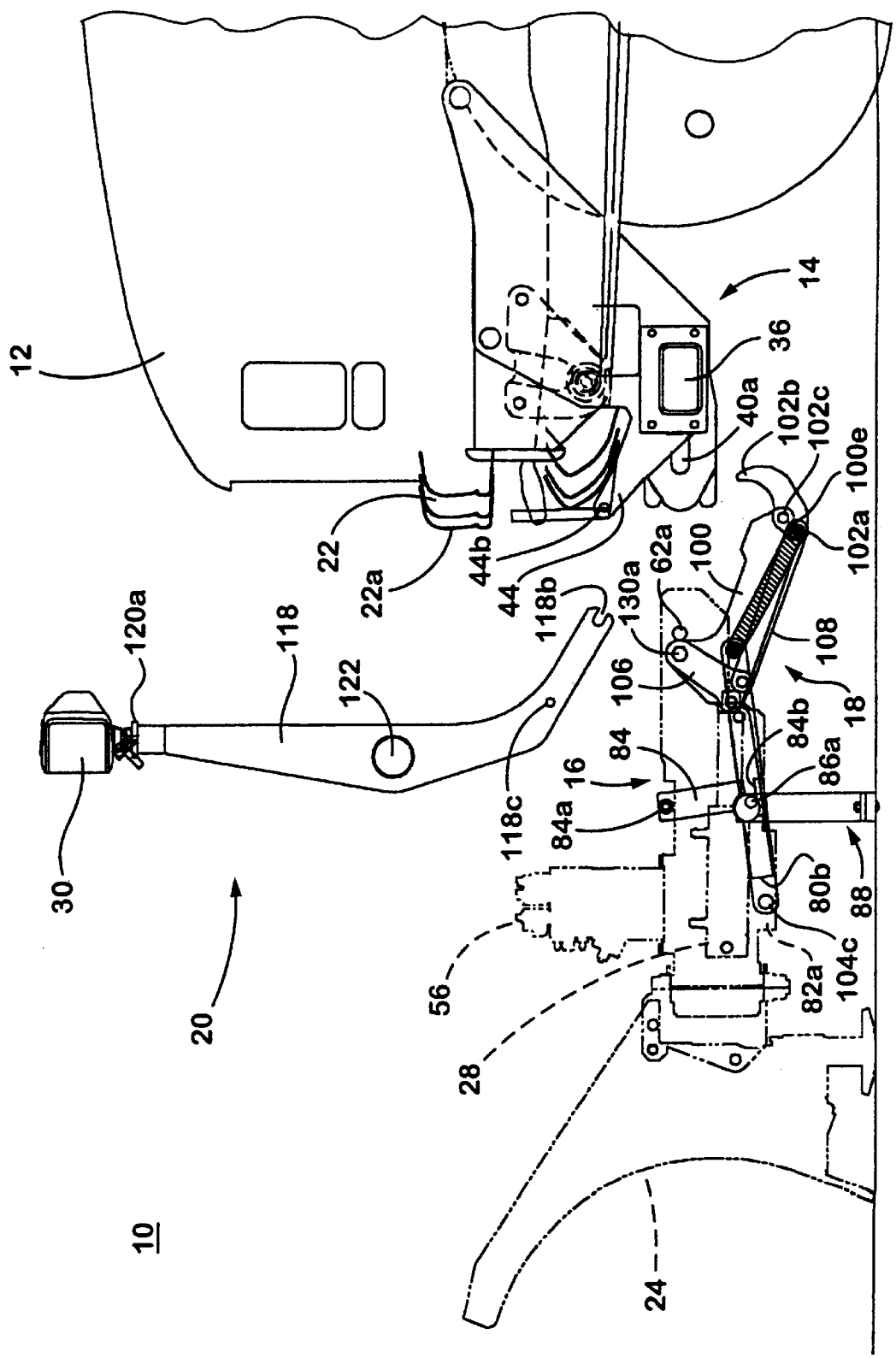
FIG. 13 is a side view of the plow and hitch assembly as it is detached from the vehicle and a support stand is in a lowered position to support the assembly.

As best shown in FIGS. 11 and 13, light tower assembly 20 is removably secured to push beam assembly 14. Slots 118b of vertical sidebars 118 engage pins 44a protruding laterally outwardly from light tower brackets 44 on push beam 36 as holes 118c and mounting pins 124 in vertical sidebars 118 are aligned with corresponding holes 44b in light tower mounting brackets 44. Inner pins 124b are extended to their extended position which inserts inner pins 124b through holes 44b, thereby preventing relative movement between light tower assembly 20 and push beam assembly 14. Because lock pins 124 are preferably spring loaded, inner pins 124b remain biased within the holes 44b, such that accidental removal of lock pins 124 from light tower assembly 20 and push beam assembly 14 is substantially precluded.

ATTACHMENT AND OPERATION

The attachment and operation of the draw latch assembly 18 and lift arm assembly 16 and push beam assembly 14 will now be discussed in detail with respect to FIGS. 13 through 17. As shown in FIG. 13, draw latch assembly 18 is pivotally connected to lift arm assembly, as discussed above, and support stand assembly 88 is in its lowered position or support position to support arm lift assembly 16 and draw latch assembly 18 above the ground when they are not attached to push beam assembly 14. When support stand 88 is in its support position, cylindrical pin 86a extending from shaft 86 of the kickstand assembly 88 is rotated to its lowered position within slot 84b of vertical connecting member 84. This positions lift stop links 80 in their lowered position, since they are pivoted about pivot pin 78 such that a forward end 80b of each lift stop link 80 is positioned within channel 82a. Hydraulic cylinder 28 is retracted with pump and motor 56, such that compression springs 28c on rod 28d are compressed while intermediate links 106 are pivoted forward and connecting links 108 are also moved forwardly, thus pivoting draw links 102 to their retracted or opened position about pivot pin 102c on mounting links 100. Further retraction or rotation of draw links 102 is prevented as pin 102a engages recesses 100e along the lower edges of mounting links 100. Therefore, further retraction of hydraulic cylinder 28 results in a downwardly pivoting of mounting links 100 about pivot axis 130a, such that mounting links 100 and draw links 102 are in their lowered positions as shown in FIG. 13. In order to connect the plow and hitch assembly to the push beam assembly 14, which is secured to vehicle 12, vehicle 12 is then driven forward until push beam 36 is positioned forwardly of the curved ends 102b of draw links 102.

Prior to draw latch assembly 18 and lift arm assembly 16 being connected to push beam assembly 14, light tower assembly 20 may be easily secured to push beam assembly 14. This is accomplished by engaging slots 118b on side bars 118 with the pins 44a on light brackets 44. After the pins 44a are within slots 118b, light tower assembly 20 may be easily pivoted about pins 44a until holes 118c and lock pins 124 in side bars 118 are aligned with corresponding holes 44b in brackets 44. Once the holes 18c and 44b are aligned, inner pins 124b are preferably rotated such that inner pins 124b are extendable into their extended position, which results in inner pins 124b inserting through holes 44b and securing light tower assembly 20 to push beam assembly 14. Light tower assembly 20 may likewise be removed from push beam assembly 14 by pulling laterally outwardly on tee handle 124c of pins 124 such that inner pins 124b are disengaged from holes 44b. Inner pins 124b may also be rotated to remain in their retracted position.

Figure 14:
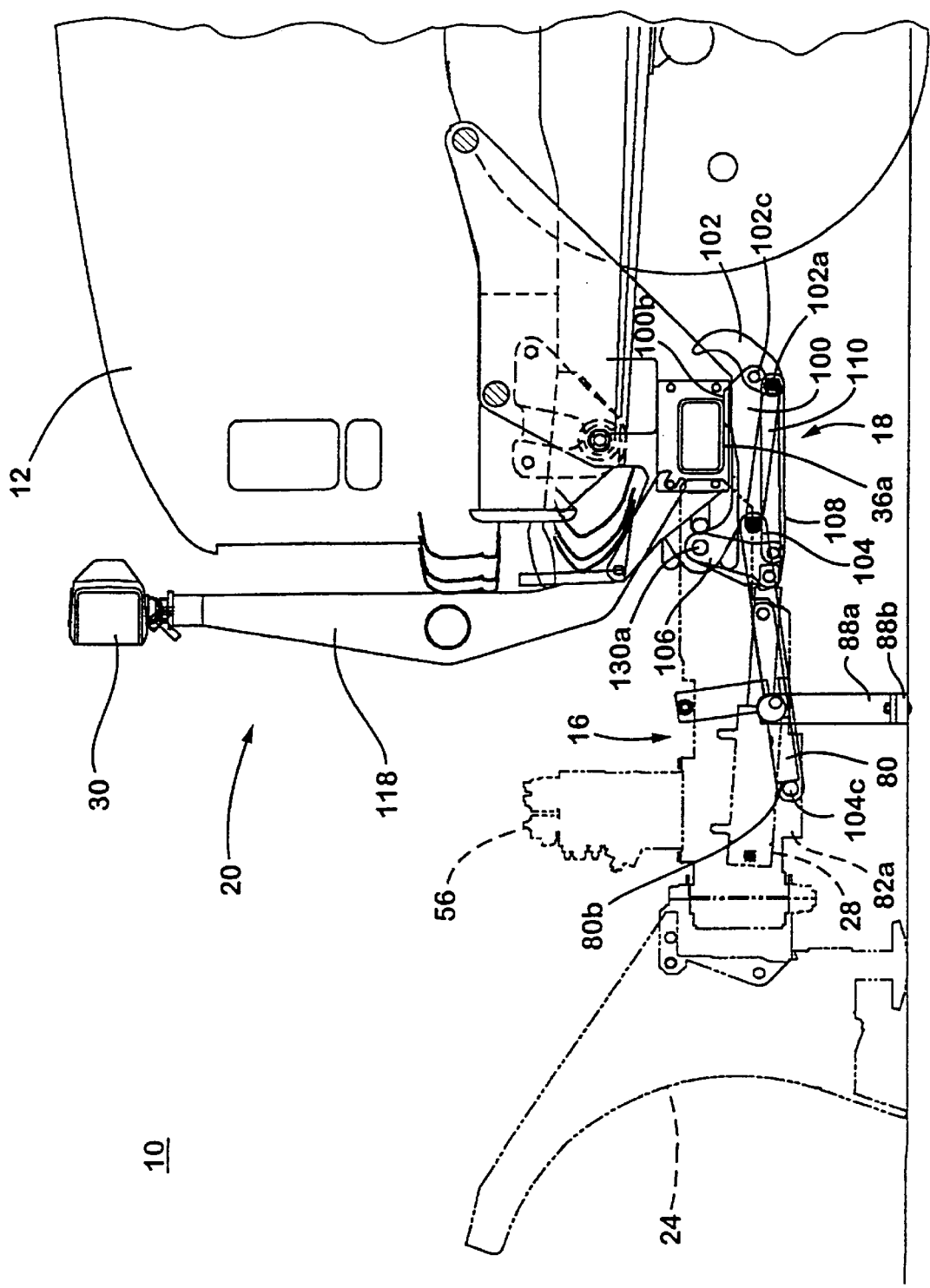
FIG. 14 is a side view of the plow and hitch assembly of FIG. 13 as a mounting link of the draw latch assembly is raised toward a push beam assembly attached to the vehicle.

After vehicle 12 has been driven into position above draw latch assembly 18, the electrical cables (not shown) may be connected between appropriate switches or controls within vehicle 12 and power source 56 in a conventional manner. With vehicle 12 in the appropriate position relative to lift arm assembly 16, hydraulic cylinder 28 may be energized to extend and push rearwardly on intermediate links 106 at pivot openings 106b. This causes a rearward rotation of intermediate links 106 about pivot axis 130a, as shown in FIG. 14. This rearward rotation of intermediate links 106 correspondingly moves connecting links 108 in a rearwardly direction relative to lift arm assembly 16. However, because draw latch springs 110 bias draw links 102 in their retracted and open position, the initial rearward movement of connecting links 108 functions to pivot mounting links 100 about pivot axis 130a (in a counterclockwise direction in FIG. 14), as intermediate links 106 likewise pivot thereabout, rather than to pivot draw links 102 about axis 102c. This is accomplished by selecting a coil spring 110 with a spring force greater than the resistance to rotation of mounting links 100 about pivot axis 130a.

As mounting links 100 are pivoted upward by the initial extension of hydraulic cylinder 28, lift stop arms 104 are correspondingly moved rearward relative to lift arm assembly 16. This results in slide pins 104c also moving or sliding rearward along channel 82a of lift arm assembly 16. At a point substantially corresponding to a position of mounting links 100 being in a substantially horizontal position and/or where the flat section 100b on mounting links 100 contacts underside 36a of push beam 36, slide pins 104c of lift stop arms 104 contact forward end 80b of lift stop links 80, as they are in their lowered position corresponding to the support position of support stand 88. The contact of slide pins 104c with lift stop links 80 substantially precludes further rearward travel of lift stop arms 104, thereby preventing mounting links 100 from pivoting further upward beyond their horizontal position.

At this point, further rotational movement of mounting links 100 is precluded by lift stop links 80 and lift stop arms 104. Further extension of lift cylinder 28 thus provides further rotational and rearward movement of intermediate links 106 about pivot axis 130a, thereby further moving connecting links 108 in a rearwardly direction. Because mounting links 100 cannot pivot further about pivot axis 130a, the further rearward movement of connecting links 108 rotates draw links 102 about pivot axis 102c on mounting links 100 (in a counterclockwise direction in FIG. 14), as the spring force of springs 110 is then overcome by the hydraulic cylinder 28.

Figure 15:
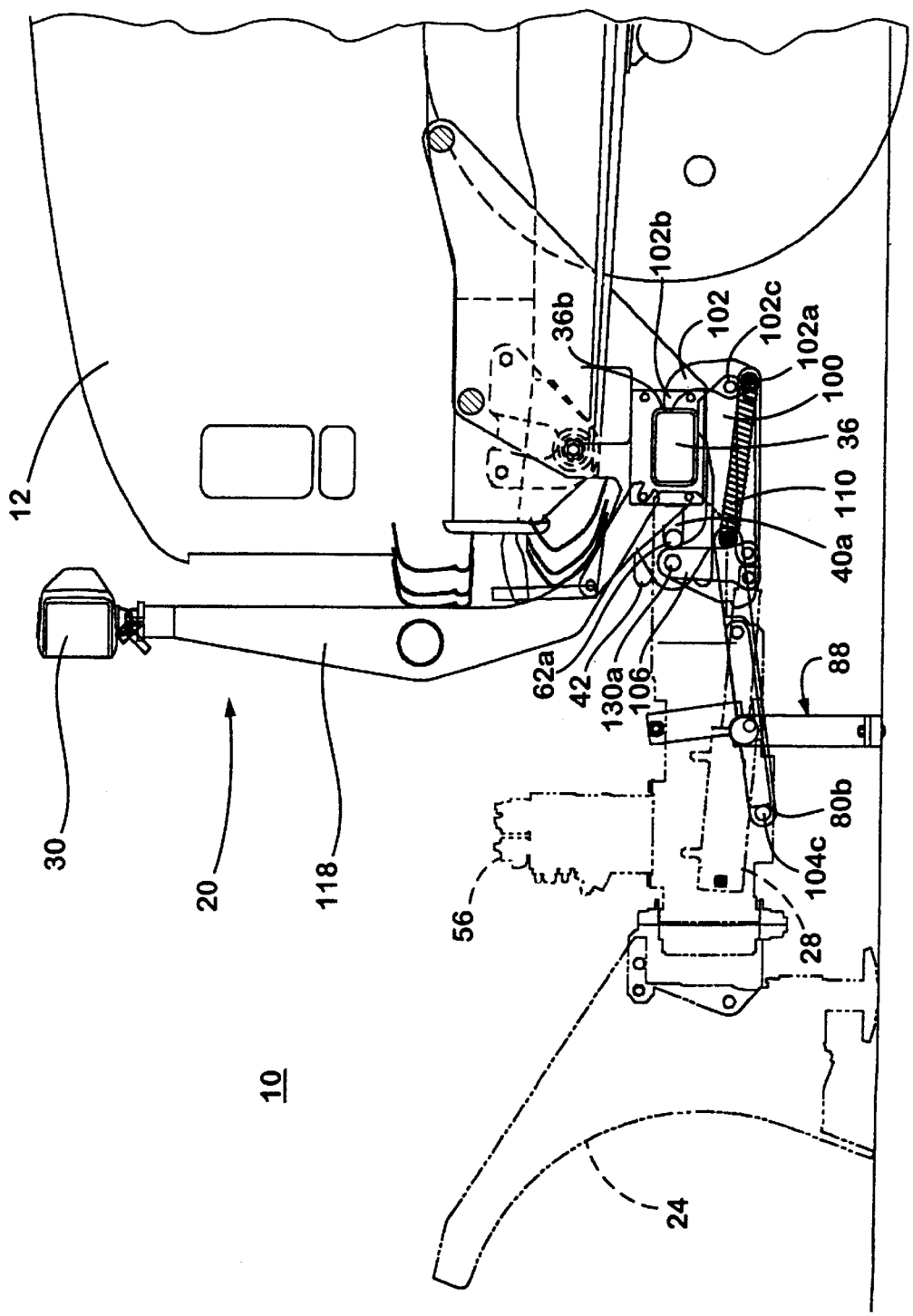
FIG. 15 is a side view of the plow and hitch assembly of FIG. 13 as a draw link of the draw latch assembly is pivoted to engage the push beam.

As shown in FIG. 15, with the lift support assembly 88 in its support position, and slide pins 104c thus contacting lift stop links 80, further actuation or extension of hydraulic cylinder 28 pushes intermediate links 106 to pivot further about pivot axis 130a, results in a pivoting of draw links 102 about their pivot axis 102c. Draw links 102 pivot such that the curved ends 102b contact a rearward portion 36b of push beam 36. Further extension of hydraulic lift cylinder 28 causes further rotation of draw links 102, such that draw links 102 bear on the rearward side 36b of push beam 36 and draw or pull the hitch assembly 10 with plow 24 attached toward vehicle 12. Draw links 102 continue to pivot about pivot axis 102c on mounting links 100 until the mounting holes 40a and 62a are properly aligned for easy insertion of pivot pins 68. Pivot pins 68 may then be easily inserted through the mounting holes and secured therein by lock pins 74 or the like.

As vehicle 12 is driven toward lift arm assembly 16 and draw latch assembly 18 and/or while draw latch assembly 18 is pulling lift arm assembly 16 into position adjacent to push beam assembly 14, both vertical and lateral positioning of lift arm assembly 16 is aided by the mounting brackets on both lift arm assembly 16 and push beam assembly 14. More specifically, the substantially V-shaped slots 42a in guide brackets 42 on push beam 36 initially engage guide bushings 72 on lift arm assembly 16 as the lift arm assembly 16 approaches push beam assembly 14. The mounting holes 40a and 62a on the mounting brackets are vertically adjusted relative to one another as the guide bushings 72 further engage V-shape slots 42a, which narrow to a width substantially equal to the diameter of the guide bushings 72. When guide bushings 72 are within the narrowed portion of slot 42a, pivot holes 40a and 62a are substantially aligned relative to one another for insertion of pivot pins 68 therethrough. Furthermore, lateral adjustment of lift arm assembly 16 relative to push beam assembly 14 is provided by the outwardly flared sections 62c of outer mounting flanges 62 and the inwardly flared sections 66c of inner bushing supports 66. These flared sections initially contact a forward edge of either the mounting bracket 40 or the guide bracket 42 extending forwardly from push beam 36 and laterally adjust the assembly such that both the guide bracket 42 and mounting bracket 40 slide between the inner and outer bushing supports 64 and 66 and between the outer bushing support 64 and outer mounting flange 62, respectively.

Figure 16:
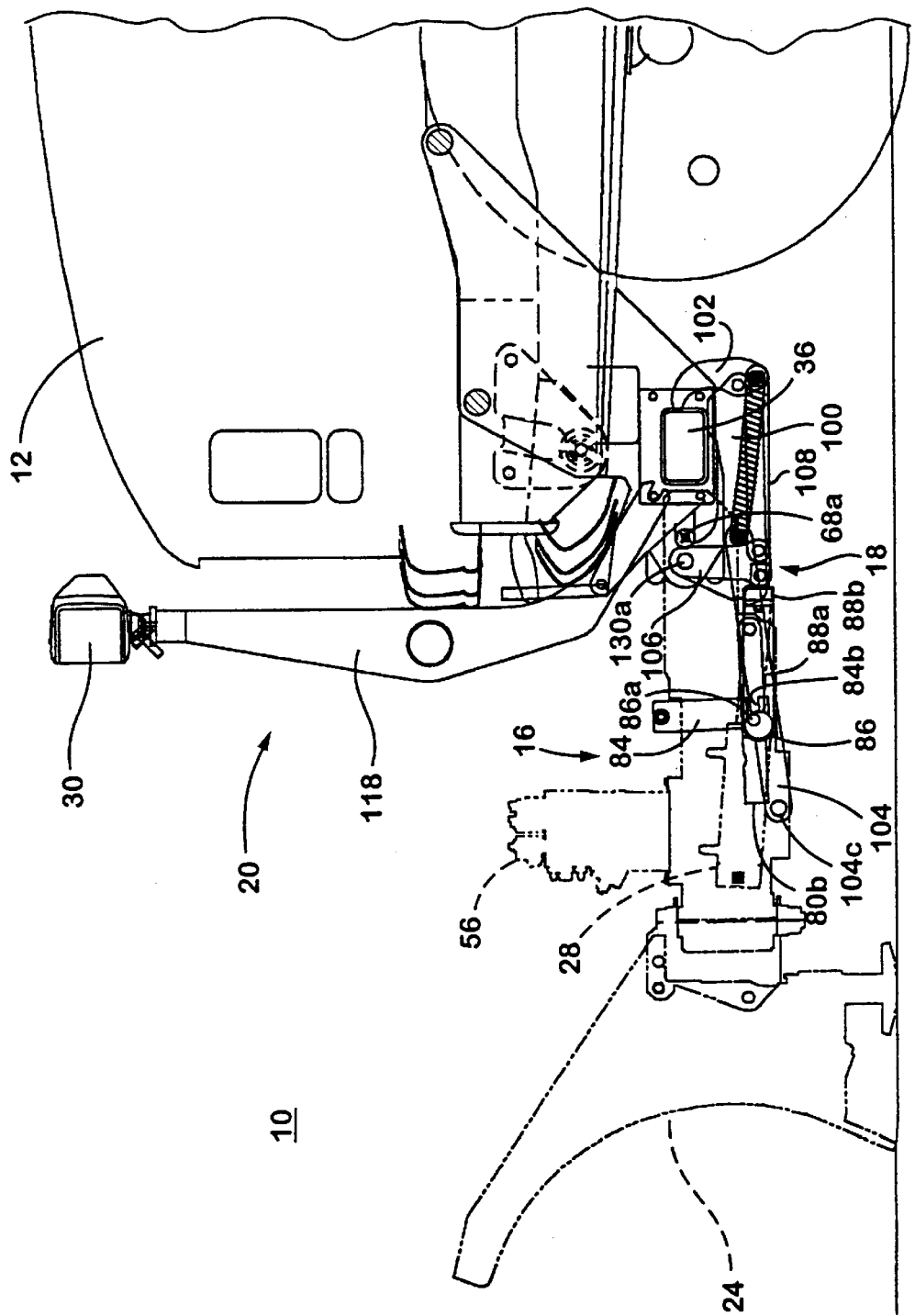
FIG. 16 is a side view of the plow and hitch assembly of FIG. 13 after the lift arm assembly has been pivotally secured to the push beam assembly and the support stand has been moved to a raised position.

After pivot pins 68 have been inserted through their respective mounting holes 40a and 62a to thereby establish pivot axis 68a, support stand assembly 88 may be pivoted into its raised position, as shown in FIG. 16. By raising kickstand assembly 88, cylindrical extension 86a in shaft 86 pivots upwardly within slot 84b along vertical connecting member 84 of lift stop link 80. This results in a upward movement of lift stop links 80, as they pivot about pivot pins 78 relative to lift arm 16. When support stand assembly 88 is in its fully raised position, as shown in FIG. 16, forward ends 80b of lift stop links 80 are thus raised to a level above slide pins 104c of lift stop arms 104, thereby again allowing rearward movement of slide pins 104c along channels 82a of lift arm assembly 16. Because slide pins 104c are connected to mounting links 100 by tilt stop arms 104, this unrestrained movement of slide pins 104c allows for further rotational movement of mounting links 100 about pivot axis 130a, which thus allows further rotation of lift arm assembly 16 relative to draw latch assembly 18 about axis 130a. In this position, compression springs 28c maintain hydraulic cylinder 28 in a partially extended position even if there is a decrease in pressure within hydraulic cylinder 28. This holds mounting links 100 in contact with push beam 36 when the plow is operated in a "float" position, where the blade is lowered for plowing and the hydraulic cylinder 28 is not fully pressurized, in order to allow the plow blade to move or "give" in response to contacting an object while plowing.

Referring now to FIG. 17, hitch assembly 10 is shown in a raised position. This position results from further extension of hydraulic cylinder 28 while support stand 88 is in its raised position, as discussed above. As was described with respect to FIGS. 13 and 14, extension of hydraulic cylinder 28 normally causes rotation of mounting links 100 relative to lift arm assembly 16 about pivot axis 130a when slide pins 104c are free to travel along channels 82a. However, because draw links 102 are now engaged with push beam 36 and pivot pins 68 are installed through the mounting brackets of lift arm assembly 16 and push beam assembly 14, further upward rotation of mounting links 100 is substantially precluded. Therefore, any further extension of a hydraulic cylinder 28 results in a lifting of the front end of lift arm assembly 16 and thus of the plow blade 24, as lift arm assembly 16 is pivoted about pivot axis 130a (in a clockwise direction in FIG. 17) relative to draw latch assembly 18 and about pivot axis 68a relative to push beam assembly 14. Lift arm assembly 16, therefore, pivots about two pivots axes 130a and 68a in response to any further extension or retraction of hydraulic cylinder 28. This rotation of pivot axis 130a relative to pivot axis 68a causes the forward end of mounting links 100 to move vertically upward as hydraulic cylinder 28 is extended, thus increasing clearance between the forward end of mounting links 100 and the ground when the plow is in its raised "transport" position.

Hitch assembly 10 therefore provides an assembly which provides for easy connection to a vehicle and for raising and lowering of the plow assembly, all with only a single hydraulic cylinder or power source. Furthermore, as best shown in FIG. 13, a forwardmost portion of all of the mounting brackets or flanges extending forwardly from push beam 36 beneath vehicle 12 terminate at a point substantially below and rearward of a front edge 22a of bumper 22 on vehicle 12. This allows for the lift arm assembly 16 and draw latch assembly 18 to be removed as a unit from vehicle 12. In addition, light tower assembly 20 may be separately removed from push beam assembly 14. Thus, after both removal steps, there are no components left behind on vehicle 12 which may be visible or easily damaged when the plow and hitch assembly 10 is not in use, except for the push beam assembly 14 which, as described above, is below and behind the front bumper.

ALTERNATE EMBODIMENT

In an alternate embodiment of the present invention, as shown in FIGS. 18–22, a hitch assembly 200 includes a lift arm assembly 16' which implements a cable release mechanism to insert and retract mounting pins 68' in their respective mounting holes. This embodiment includes the same draw latch assembly 18, push beam assembly 14 and light tower assembly 20 of the preferred embodiment and the same mounting brackets 60 along the lift arm assembly described above. Accordingly, the discussion of this embodiment will focus on the changes to lift arm assembly 16' and how the cable release system functions.

Lift arm assembly 16' includes a release lever 202 which functions to both allow for insertion and retraction of a pair of mounting pins 68' through corresponding mounting brackets 60 and 40 similar to the mounting brackets of lift arm assembly 16, and push beam assembly 14 discussed above, and also to raise and lower a pair of lift stop links 204 (FIG. 19), as discussed below. Handle 202 includes a pair of laterally spaced apart side members 206 and a laterally extending or handle bar 208 which connects the side members 206 at one end. A second laterally extending bar 210 is preferably provided between the side members 206 and further includes a spring pin 212 protruding therethrough. Handle 202 is positioned on an upper surface of the center beam 50 of lift arm assembly 16' and is located forwardly of cross beam 52. A substantially L-shaped frame or bracket 214 is secured to center beam 50 in a position forwardly of handle 202 and extending rearwardly and over a pivot axle 216, about which handle 202 is pivoted. Pivot axle 216 includes a pair of substantially circular disks 218 extending in planes generally perpendicular to pivot axle 216 and spaced laterally apart along pivot axle 216, which has a diameter substantially less than the diameter of the circular disks 218. Circular disks 218 are also positioned eccentrically with respect to an axis 216a of cylindrical axle 216 (FIG. 18), and are positioned immediately adjacent to both the upper surface of center beam 50 and a vertical portion 214a of L-shaped bracket 214 such that when handle 202 is rotated, circular disks rotate and slidably engage the upper surface of center beam 50. Rotational movement of handle 202 about its pivot axis 216a also results in a corresponding substantially vertical movement of pivot axle 216 since it is pivoted eccentrically with the rotating circular disks 218. Circular disks 218 remain in contact with L-shape bracket 214 and center beam 50 and are substantially precluded from rearward movement due to their connection with lift stop links 204, as discussed below.

Lift stop links 204 are each interconnected to a side of handle 202 by a connecting member 220, which extends rearwardly and downwardly from pivot axle 216 of handle 202, and is welded or otherwise secured to each lift stop link 204. Rotation of handle 202 raises pivot axle 216 and connecting members 220, which then raise lift stop links 204. Therefore, rotation of handle 202 accomplishes the same vertical movement of lift stop links 204 as rotation of support stand assembly 88 provides for lift stop links 80 in hitch assembly 10. Connecting member 220 further functions to maintain the position of handle 202 substantially adjacent to L-shaped bracket 214, as connecting member substantially precludes rearward movement of handle 202.

Figure 18:
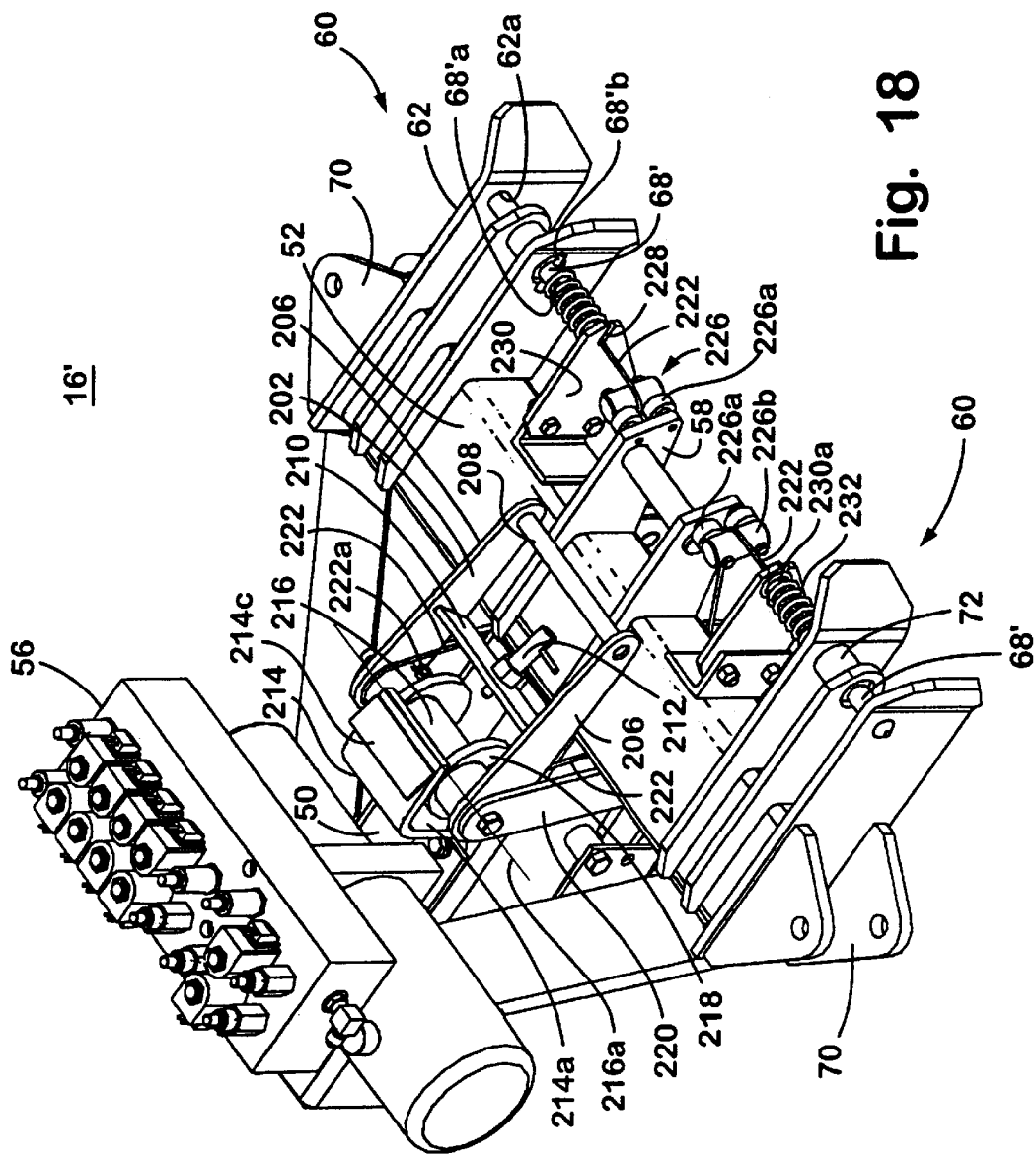
FIG. 18 is an upper rear perspective view of a lift arm assembly according to an alternate embodiment of the present invention.
Figure 19:
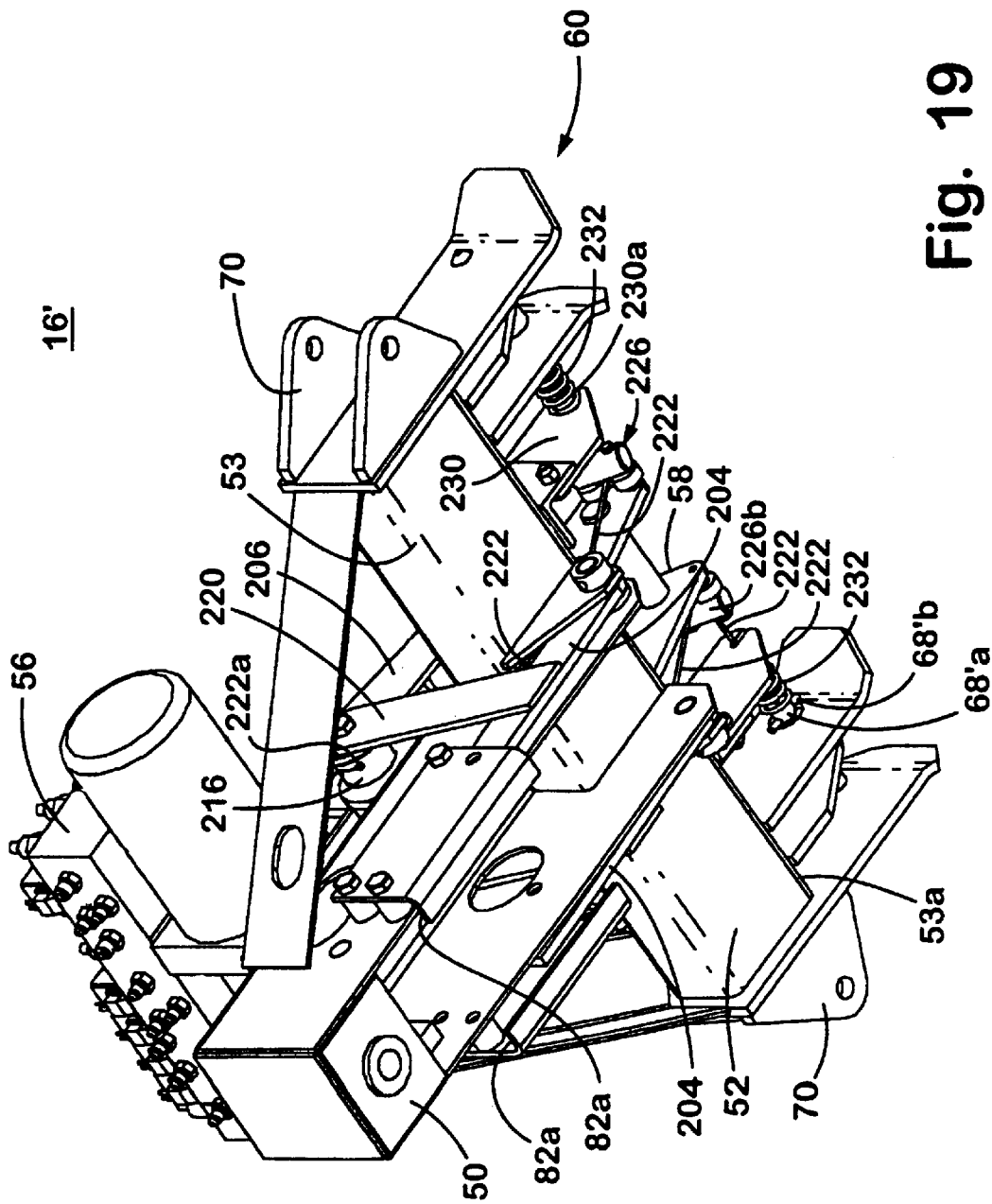
FIG. 19 is an underside front perspective view of the lift arm assembly of FIG. 18.

The release mechanism of lift arm assembly 16' preferably includes a pair of cables 222, which interconnect handle 202 to mounting pins 68'. Cables 222 are connected at one end 222a to cylindrical axle 216 and are wound around cylindrical axle 216 on each end thereof and spaced laterally outward from circular disks 218. As best shown in FIG. 19, cables 222 then preferably extend downwardly and rearwardly from cylindrical axle 216 and are guided rearwardly as they curve about a lower forward edge 53 of cross beam 52. Cables 222 then extend rearwardly beneath cross beam 52 and are further guided at upwardly and further rearwardly by a lower rearward edge 53a, which allows cables 222 to curve upwardly toward a cable guide 226. Cable guide 226 is mounted at a rearward portion of draw latch assembly mounting bracket 58 and includes a pair of circular disks 226a between which cables 222 are guided and a cylindrical portion 226b around which cables 222 are curved so that they are directed outwardly toward mounting brackets 60 on lift arm assembly 16'. Each cable 222 is then fed through a slotted opening 228, which is formed in a substantially L-shaped bracket 230 which is welded or otherwise secured to a rearward portion of crossbeam 52 and extending rearwardly therefrom. A cylindrical extension 230a extends laterally outward from each bracket adjacent the slotted opening 228. Cables 222 are fixedly secured to an end 68'a of pivot pins 68' such that pivot pins 68' may be pulled from mounting holes 62a and 40a of mounting bracket 62 on lift arm assembly 16' and mounting bracket 40 on push beam assembly 14, respectively. A compression spring 232 is positioned between each L-shaped bracket 230 and its corresponding pivot pin 68'. Compression springs 232 receive cylindrical extension 230a at one end and ends 68' of pivot pins 68' at another end. Compression springs 232 exert a force to bias pivot pins 68' in their extended position through mounting holes 40a and 62a, as shown in FIG. 18.

Therefore, when handle 202 is rotated upward about its axle 216, cables 222 are further wound around cylindrical axle 216, which results in cables 222 pulling laterally inwardly on pivot pins 68'. The pivot pins 68' are then retracted from mounting holes 40a and 62a, as rotational movement of handle 200 and the corresponding movement of cables 222 overcome the force provided by compression springs 232 so as to allow inward movement of pivot pins 68'. A cross pin 68'b preferably extends outwardly from either side of ends 68'a of each pivot pin 68', in order to prevent over insertion of pivot pins 68' through the openings in guide bushings 72 by compression springs 232, and to provide bearing points for springs 232.

Figure 20:
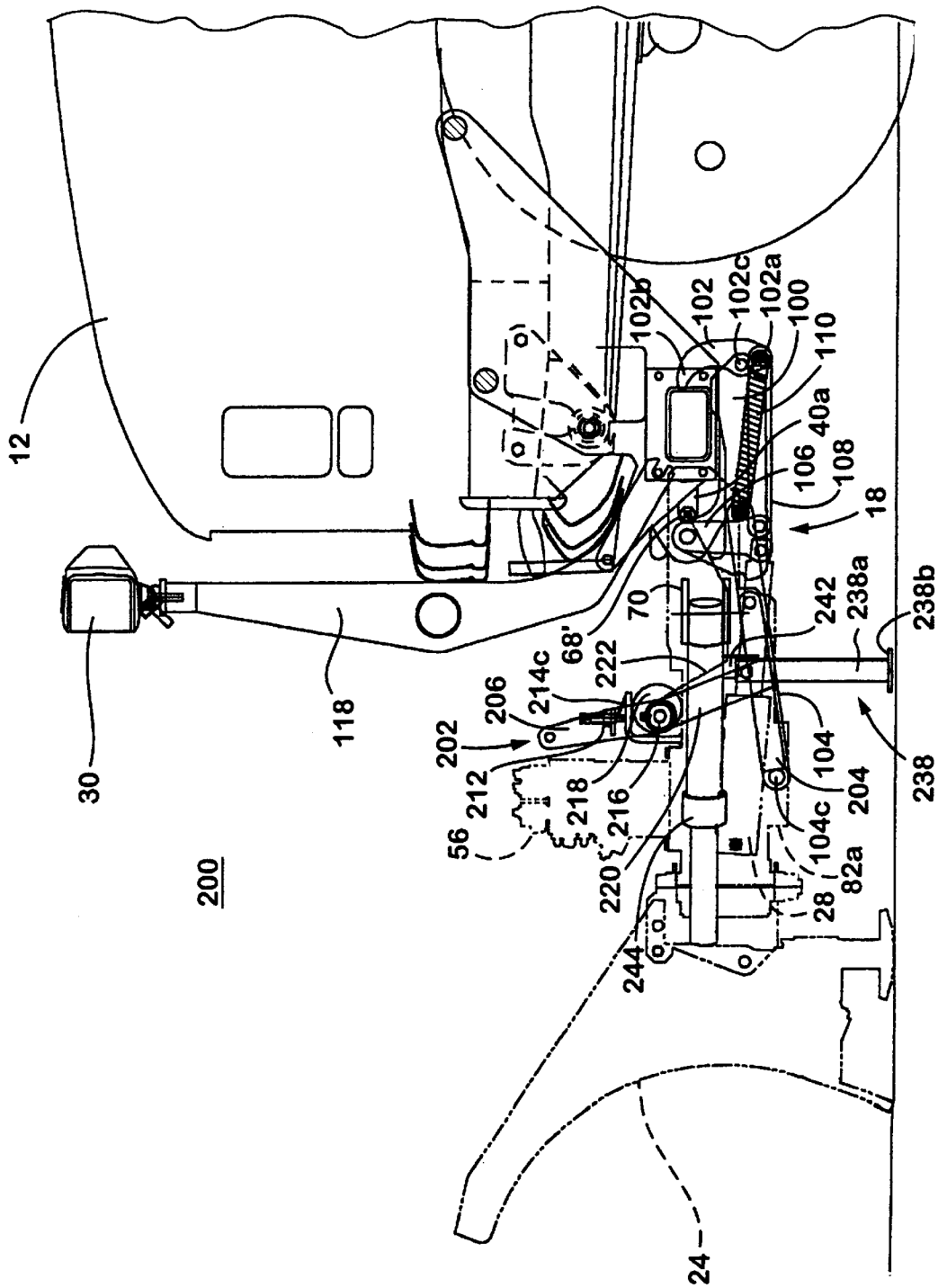
FIG. 20 is a side view of a plow and hitch assembly incorporating the lift arm assembly of FIG. 18, with the mounting link of the draw latch assembly raised toward the push beam on a vehicle and a mounting lever pivoted upward to disengage a pair of mounting pins from their respective mounting brackets.
Figure 21:
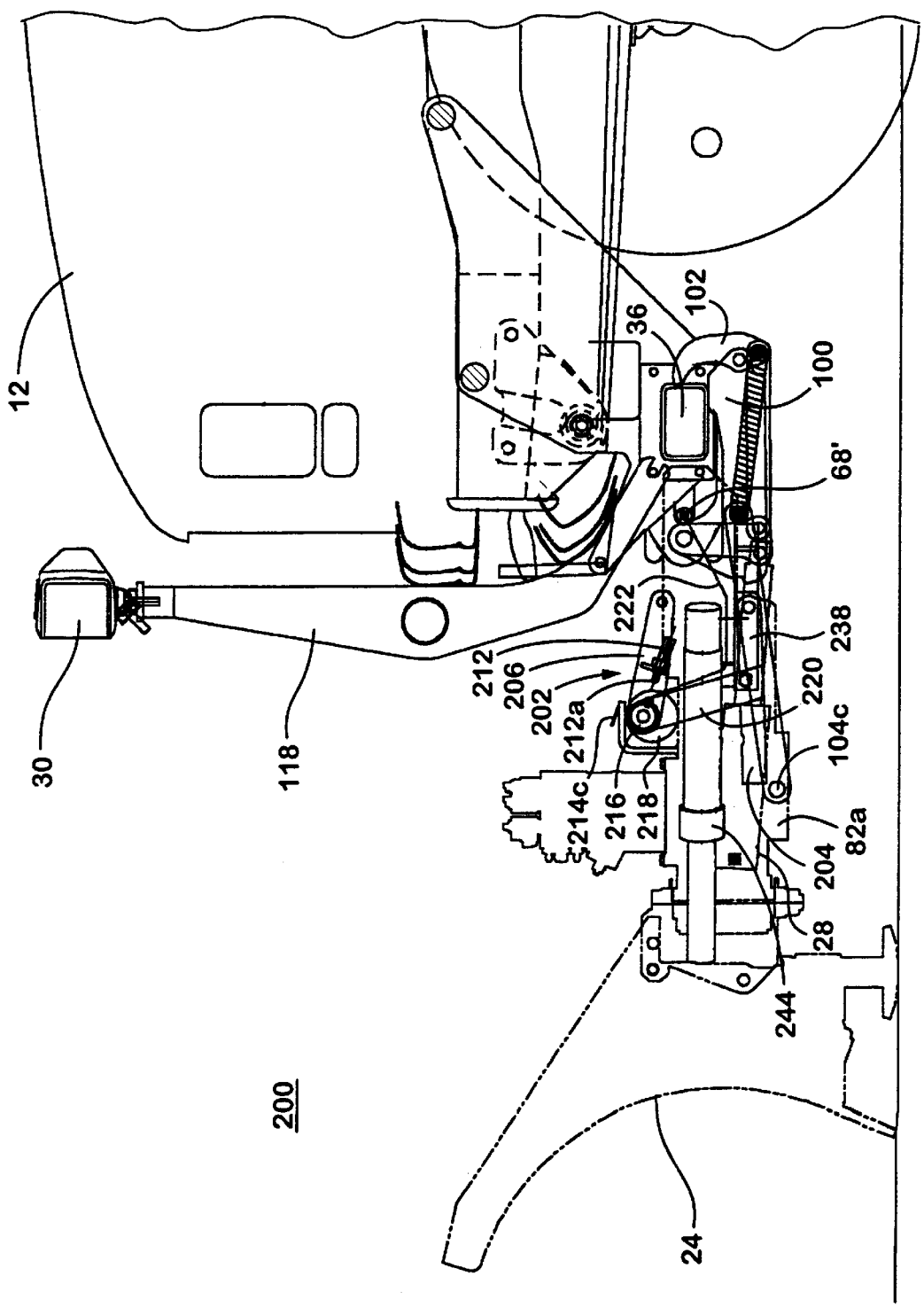
FIG. 21 is a side view of the assembly in FIG. 20 with the mounting lever pivoted to engage the mounting pins into their respective mounting brackets.

As shown in FIG. 20, lift arm assembly 16' further includes a support stand assembly or kickstand 238 which provides support of lift arm assembly 16' and draw latch assembly 18 when they are not connected to push beam assembly 14 on vehicle 12. Support stand 238 includes a vertical support leg 238a and a support foot 238b and is pivotable about a bracket 242 that is welded or otherwise secured to one of a pair of side hydraulic cylinders 244. Side hydraulic cylinder 244 extends outwardly on either side of lift arm assembly 16' from cylinder bracket 70 to the plow blade assembly 24 and provides for turning plow blade 24 to one side or another. Support stand 238 may be positioned in a lowered or support position, as shown in FIG. 20, or may be pivoted to a raised position, as shown in FIG. 21 when the hitch assembly is attached to vehicle 12. Although shown as being pivotably secured to a hydraulic cylinder, clearly support stand 238 may be positioned elsewhere on lift arm assembly 16' without affecting the scope of the present invention.

When handle 202 is pivoted to its upward position, cables 222 are wrapped further around cylindrical axle 216, which results in pivot pins 68' being held in a retracted position from mounting holes 40a and 62a. In this upward position of handle 202, spring pin 212 of middle lateral member 210 is positioned forwardly of an upwardly extending flange 214c on L-shaped bracket 214 (FIG. 20). Spring pin 212 is biased to be in a lowered position such that a side of pin 212 engages a forward edge of flange 214c, thereby substantially locking handle 202 in its upright position and preventing accidental rearward or downward rotational movement of handle 202 relative to lift arm assembly 16'. Furthermore, when handle 202 is in its raised position, cylindrical axle 216 is in its lowered position as it rotates eccentrically about circular disks 218. This results in connecting members 220 also being lowered such that lift stop links 204 are correspondingly lowered to their lowered position within channels 82a in order to engage and limit rearward movement of slide pin 104c of draw latch assembly 18 along channels 82a, as discussed above with respect lift stop links 80 of lift arm assembly 16. This allows hydraulic cylinder 28 to operate draw latch assembly 18, but not raise lift arm assembly 16 as mentioned above.

After vehicle 12 has been positioned in proper alignment with lift arm assembly 16' and draw latch assembly 18, draw latch assembly 18 is operable as described above to pull the plow and hitch assembly into proper alignment with the mounting brackets of push beam assembly 14 on vehicle 12.

Figure 22:
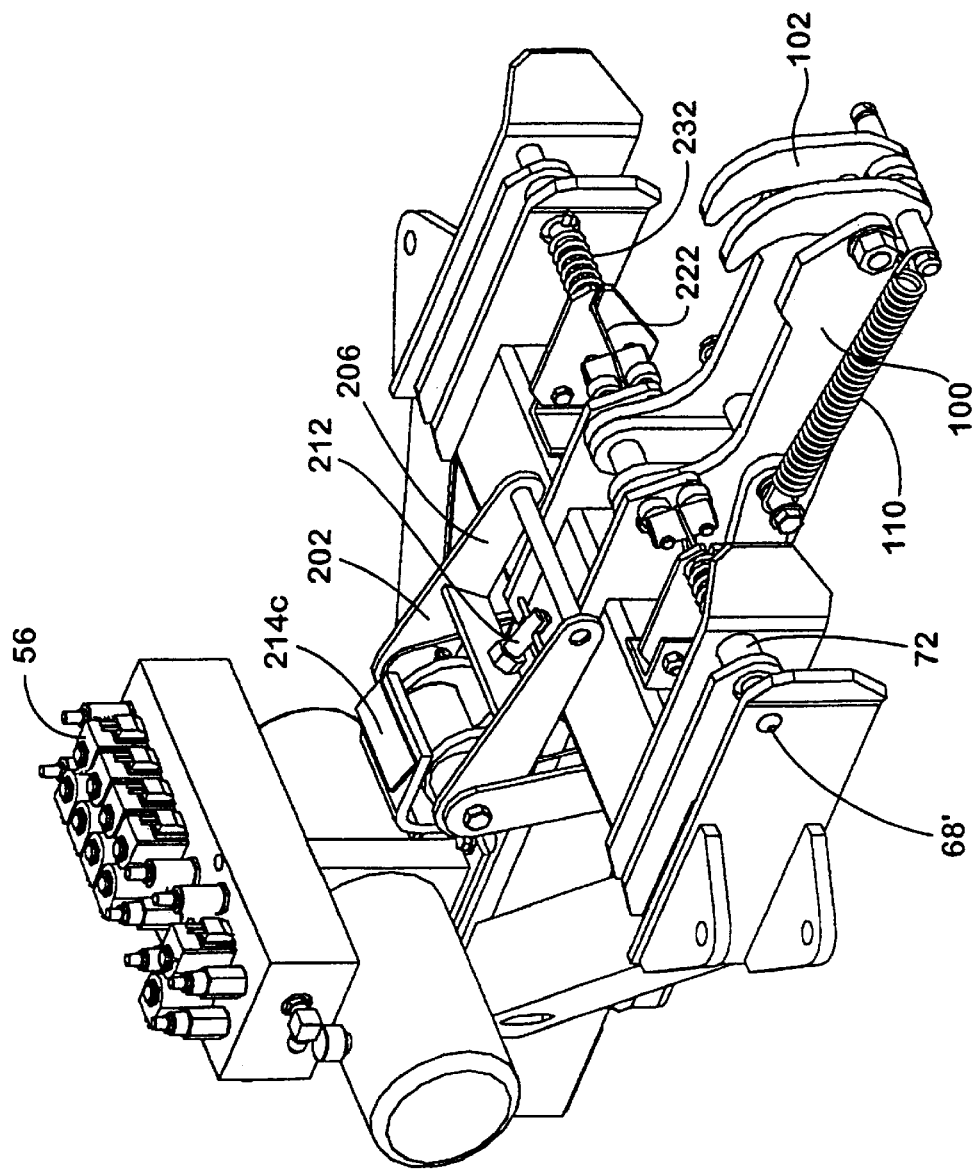
FIG. 22 is an upper rear perspective view of the lift arm and draw latch assemblies of the plow and hitch assembly of FIG. 20.

Once the mounting holes 40a and 62a of mounting brackets 40 and 62, respectively, have been properly aligned, handle 202 may be rotated downwardly to allow engagement of pivot pins 68' with mounting holes 40a and 62a (FIGS. 21 and 22). This is accomplished by first pulling upward on spring pin 212 such that a lower end 212a of spring pin 212 clears flange 214c on L-shaped bracket 214 to allow forward rotation of handle 202. As handle 202 is then pivoted downward, cables 222 are unwound from cylindrical axle 216, which allows compression springs 232 to push pivot pins 68' through the corresponding mounting holes on the mounting brackets of lift arm assembly 16' and push beam assembly 14. Furthermore, as handle 202 is pivoted downward, cylindrical axle 216 is rotated upwardly due to eccentric positioning with respect to circular disks 218. This results in an upward movement of connecting members 220 and a corresponding upward movement of lift stop links 204. As discussed above with respect to lift stop links 80, an upward movement of lift stop links 204 removes lift stop links 204 from the path of slide pin 104c along channel 82a, such that slide pin 104c may continue travelling rearwardly along channel 82a. This again allows for relative rotation between draw latch assembly 18 and lift arm assembly 16', such that actuation and extension of cylinder 28 results in a raising or lowering of a forward end of lift arm assembly 16' and plow blade 24. As shown in FIG. 21, support stand assembly 238 may be pivoted upward to a raised position when lift arm assembly 16' has been secured to push beam assembly 14 on vehicle 12.

SECOND ALTERNATE EMBODIMENT

Figure 23:
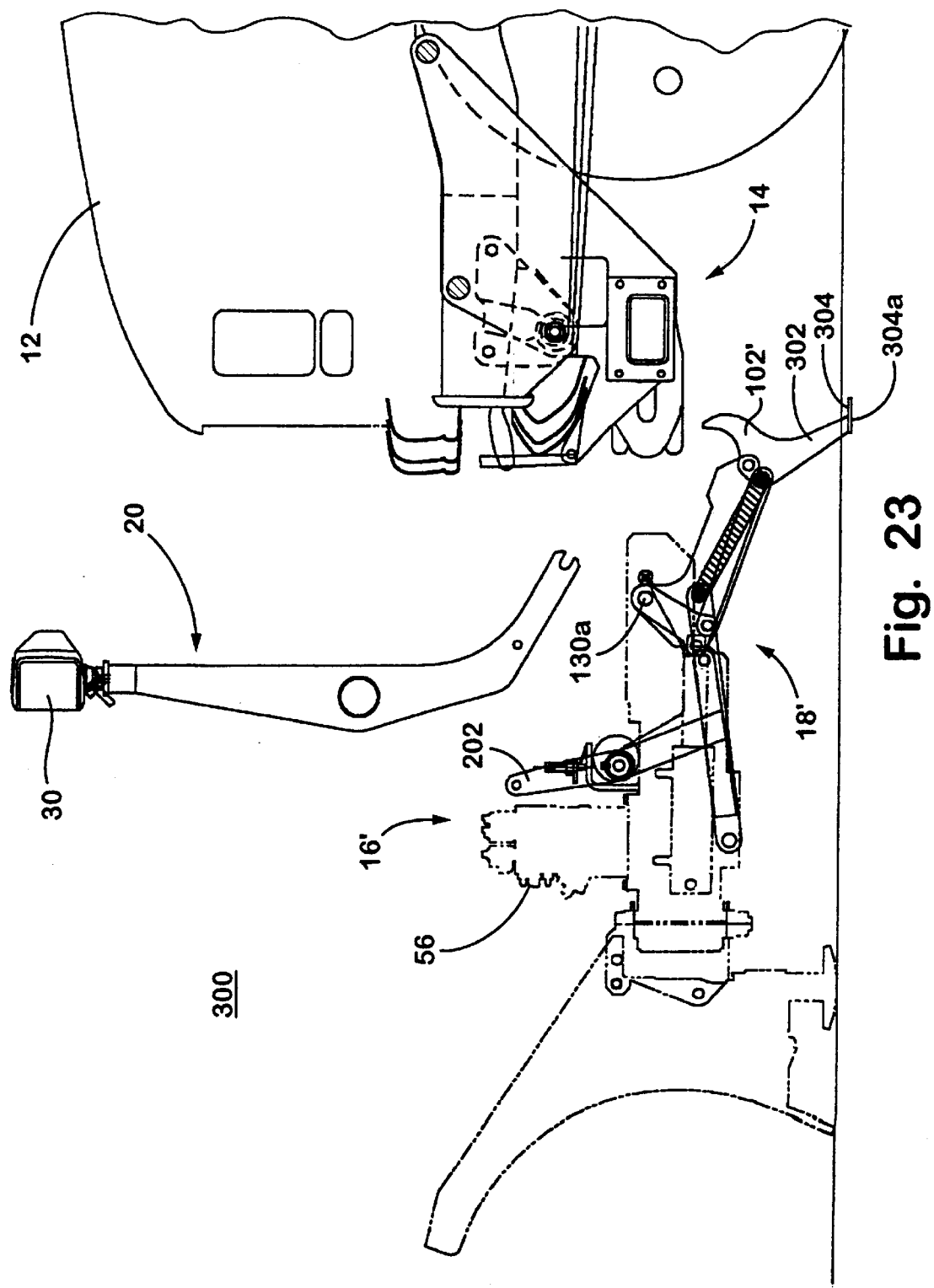
FIG. 23 is a side view of a plow and hitch assembly similar to the one shown in FIG. 20, incorporating a draw link and support member in accordance with an alternate embodiment of the present invention.
Figure 24:
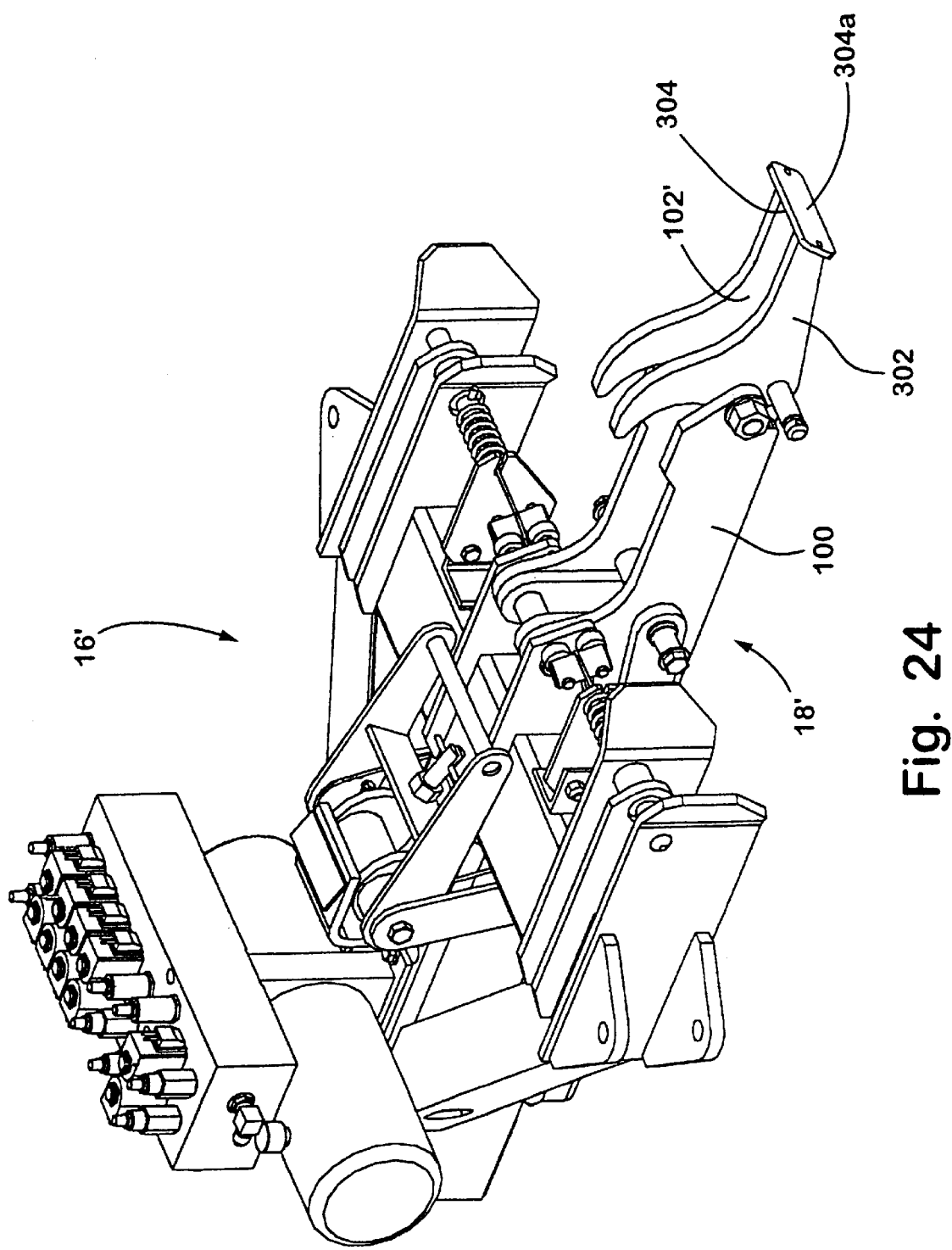
FIG. 24 is an upper rear perspective view of the lift arm and draw latch assemblies of the plow and hitch assembly shown in FIG. 23.

In another alternate embodiment of the present invention, a hitch assembly 300 (FIGS. 23 and 24) includes push beam assembly 14 and light tower assembly 20 of hitch assembly 10 and the lift arm assembly 16' discussed above with respect to hitch assembly 200, and a draw latch assembly 18'. Draw latch assembly 18' is substantially similar to and is operable in substantially the same way as draw latch assembly 18. However, each draw link 102' of draw latch assembly 18' includes a downward depending support section 302. Support sections 302 function to support the lift arm assembly 16' and draw latch assembly 18' when they are not connected to push beam assembly 14 on vehicle 12. Support sections 302 are preferably integrally formed with the curved hook sections of draw links 102' and are connected at a lower edge by a laterally extending foot portion 304. Foot portion 304 provides a substantially flat lower surface 304a, which rests upon the ground in order to provide stable support of the assembly when it is not connected to a vehicle.

Because support sections 302 are integrally formed with draw links 102', support sections 302 pivot with respect to lift arm assembly 16' as either draw links 102' are pivoted about mounting links 100 or mounting links 100 are pivoted about pivot axis 130a. Because support sections 302 determine the height at which the assembly is supported, this results in a raising or lowering of draw latch assembly 18' and lift arm assembly 16' as hydraulic cylinder 28 is either extended or retracted. By providing vertical adjustment of plow and hitch assembly 300 prior to vehicle 12 being driven into position substantially above the mounting links 100 and draw links 102', hitch assembly 300 may be easily set to an appropriate height at which vehicle 12 may be driven forward into position. Once vehicle 12 is in its proper position above mounting links 100 and draw links 102', draw latch assembly 18' and lift arm assembly 16' function to draw or pull the assemblies into position relative to push beam assembly 14 and further to pivotably secure the lift arm assembly 16' to push beam assembly 14, as discussed in detail above with respect to plow assemblies 10 and 200. Because support sections 302 are included on draw latch assembly 18', a support stand assembly is no longer necessary on lift arm assembly 16'. Although shown and described with draw latch assembly 18' being implemented with lift arm assembly 16', clearly the present invention provides for implementing draw latch assembly 18' with lift arm assembly 16. Support stand assembly 88 may then be eliminated from lift arm assembly 16, provided that a lever or other alternative means for raising and lowering lift stop link 80 is then provided on lift arm assembly 16.

Figure 25:
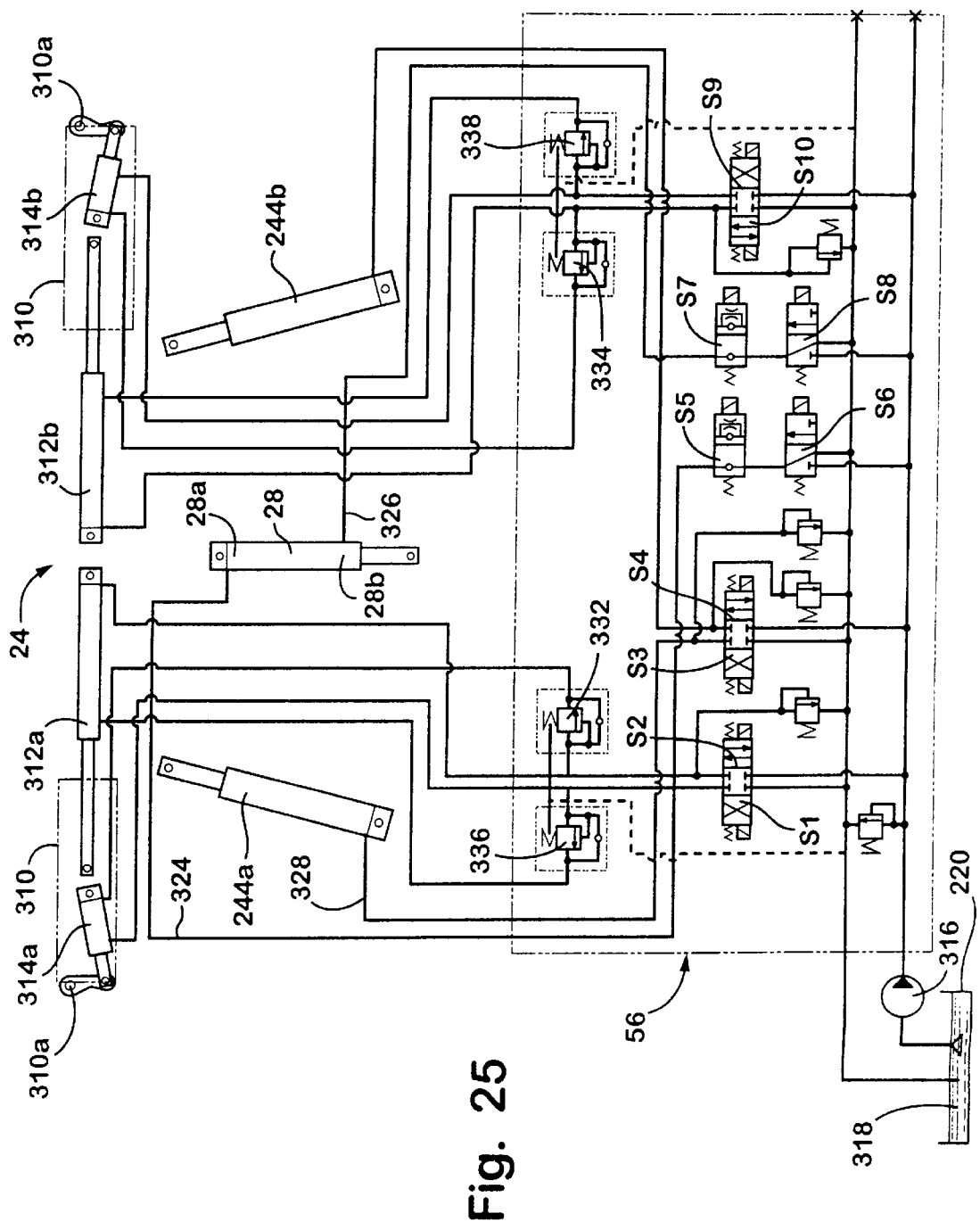
FIG. 25 is a schematic illustration of a plurality of hydraulic cylinders and solenoid valves preferably incorporated in the plow and hitch assembly according to the present invention.

Referring now to FIG. 25, a schematic is shown of the hydraulic cylinders and their interconnection with power source 56 and the snow plow assembly and plow blade 24. Most preferably, the snow plow assembly of the present invention includes a plow blade assembly 24 which further includes laterally extending wings 310 which may be pivoted forwardly when extended, as disclosed in commonly assigned U.S. Pat. No. 5,638,618, issued to Niemela et al., and co-pending, commonly assigned U.S. patent application Ser. No. 08/874,008, filed Jun. 12, 1997, the disclosures of both of which are hereby incorporated herein by reference. In order to provide lateral extension and forward folding of wings 310, plow blade assembly 24 preferably includes a pair of oppositely directed hydraulic cylinders 312a and 312b which extend and retract the wings laterally and a pair of smaller oppositely directed hydraulic cylinders 314a and 314b positioned laterally outwardly from cylinders 312a and 312b, respectively. Hydraulic cylinders 314a and 314b pivot the wings 310 forwardly about a pivot axis 310a when the wings are extended and the cylinders 314a and 314b are activated by power source 56. The snow plow and hitch assembly 10 also preferably includes a pair of hydraulic cylinders 244a and 244b interconnected between brackets 70 of lift arm assembly 16 or 16' and the plow blade assembly 24. Hydraulic cylinders 244a and 244b may be individually extended to provide a left or right angling or turning of the plow assembly 24 relative to the lift arm assembly and vehicle 12. As discussed above, hitch assembly 10, 200 or 300 most preferably further includes hydraulic cylinder 28 which provides lifting and lowering of snow plow blade assembly 24 and actuation of draw latch assembly 18 or 18'.

In order to activate the various cylinders included in the plow assembly 24 of hitch assembly 10, 200 or 300, power source 56 includes a hydraulic pump 316, which draws hydraulic fluid 318 from a reservoir 320. An operator of the snow plow may then selectively energize one or more of a plurality of solenoid valves interconnected with power source 56 and pump 316, so as to extend and/or retract one or more of the hydraulic cylinders of hitch assembly 10, 200 or 300 or plow blade assembly 24. Pump 316 and the associated solenoid valves are representative of such components commonly used in snow plow assemblies and are operated in a conventional manner.

As shown in FIG. 25, each hydraulic cylinder is connected to a pair of fluid lines, each of which is connected at an opposite end to at least one solenoid operated valve. The solenoid operated valves function to direct pressurized hydraulic fluid from the power source 56 into the selected hydraulic cylinder in order to either extend or retract the piston rods of the cylinder. Pressure release valves may also be included within the system in order to prevent over pressurization of each of these cylinders upon plow blade assembly 24 encountering an obstacle or any other event which may cause additional pressure to be built up within the fluid lines.

In order to raise or lower plow blade assembly 24 and/or to activate draw latch assembly 18 or 18', the appropriate solenoids must be energized in order to open or close the valves connected with the hydraulic fluid lines connected to either end of hydraulic cylinder 28. More specifically, in order to raise the plow blade assembly 24 or raise and pivot the lift arm assembly and draw latch assembly, a solenoid S6 is energized to pressurize fluid line 324, which is connected to an end 28a of hydraulic cylinder 28, and an electrically operated check valve S7 is opened to allow fluid in a line 326 to flow from a rod end 28b of hydraulic cylinder 28 back into reservoir 318, as cylinder 28 is extended. Conversely, in order to lower plow blade assembly 24 or disengage draw latch assembly 18 or 18' from push beam assembly 14, pressure is applied at the rod end 28b by activating a solenoid S8 to pressurize fluid line 326 and further opening a second electrically operated check valve S5 to allow fluid to return to reservoir 318 through fluid line 324. When in a plow or "float" mode, both of the check valves S5 and S7 are opened to connect both of the ends 28a and 28b of the hydraulic cylinder to the reservoir 320 in order to allow the rod 28d of hydraulic cylinder 28 to extend or retract in response to the plow blade contacting an object while plowing.

The other cylinders 244a, 244b, 312a, 312b, 314a and 314b of the plow assembly are operated in a similar manner as discussed above. Briefly, in order to angle plow blade assembly 24 to the right, a solenoid S3 is energized to provide pressure to a left hydraulic cylinder 244a through a supply line 328. Conversely, in order to angle plow blade assembly 24 to the left, a solenoid S4 is energized to provide pressurized fluid through supply line to a right hydraulic cylinder 244b. Furthermore, in order to extend the wings 310 laterally outwardly along plow blade 24, a solenoid S2 is energized to extend left hydraulic cylinder 312a and/or a solenoid S10 is energized to extend right hydraulic cylinder 312b. If it is desired that one or both of the wings 310 are to be pivoted forwardly about axis 310a, solenoids S2 and S10 remain energized until cylinders 312a and b are fully extended, at which point pressure may be supplied to the outer cylinders 314a and 314b, respectively. This is accomplished by a pair of delay valves or pressure relief valves 332 and 334 which only allow pressurized fluid to be supplied to hydraulic cylinders 314a and 314b after hydraulic cylinders 312a and 312b have been fully extended. This is preferred in order to prevent wings 310 from being pivoted forwardly when plow blade assembly 24 is not in its fully expanded position. The wings are unfolded and retracted in a similar manner by activating solenoid S1 and/or S9, which provide pressure to the opposite end of the cylinders in order to retract the cylinders. Again a pair of hydraulic relief valves 336 and 338 are provided in order to delay retraction of cylinders 312a and 312b until outer cylinders 314a and 314b have fully retracted, such that wings 310 are in a substantially straight position before they are laterally retracted by cylinders 312a and 312b.

Therefore, all of the fluid cylinders can be controlled with their corresponding solenoid operated fluid valves. These valves most preferably have an electronic control panel in the cab of the vehicle for easy access and operation by the driver. This allows the driver of the vehicle to adjust the plow assembly without leaving the vehicle cab which further allows the plow assembly to be operated while the vehicle is being driven. By providing remote control of all aspects of the plow blade assembly from within the vehicle, the efficiency of plowing snow or the like is greatly increased, as the operator of the plow does not have to repeatedly stop the vehicle and get out of the cab in order to adjust the plow blade assembly 24 in response to encountering different conditions.

Therefore, the present invention provides a plow hitch assembly which allows for an easy and efficient attachment of a plow blade and lift arm assembly to the vehicle. This is accomplished without requiring the operator of the plow to manually adjust the plow assembly vertically and/or laterally in order to align the assembly with the vehicle. The present invention further provides for an easy pivotal connection of the lift arm assembly to the push beam assembly without requiring separate manual insertion of pivot pins through mounting brackets and then further insertion of a lock pin in order to prevent accidental removal of the pivot pins while the plow is in use.

While several forms of the invention have been shown and described, other forms will forms will now be apparent to those skilled in the art. Therefore it will be understood that the embodiments shown in the drawings and described above are merely for illustrative purposes, and are not intended to limit the scope of the invention which is defined by the claims which follow as interpreted according to the principals of patent law, including the Doctrine of Equivalents.

The embodiments of the invention in which an exclusive property right or privilege is claimed are defined as follows:

1. A hitch assembly adapted for mounting a plow on a vehicle, the vehicle having a frame and a bumper, and a push beam assembly being secured to the frame of the vehicle, said hitch assembly comprising:

a lift arm assembly having a first end and a second end, said first end of said lift arm assembly adapted for connection with a plow blade, said second end of said lift arm assembly adapted to removably and pivotally connect to the push beam assembly;

a draw latch assembly which selectively pulls said lift arm assembly toward the push beam assembly and pivots said lift arm assembly relative to the push beam assembly to vertically move the plow blade; and a power source interconnected with said lift arm assembly and said draw latch assembly, said power source operable to at least partially move at least one portion of said draw latch assembly such that said draw latch assembly engages the push beam assembly and pulls said lift arm assembly toward the push beam assembly, said power source further operable to at least partially pivot said lift arm assembly relative to the push beam assembly and said at least one portion of said draw latch assembly to pivot and vertically move the plow blade.

2. The hitch assembly of claim 1, wherein said draw latch assembly includes a mounting link and a draw link, said mounting link having a first end and a second end, said first end of said mounting link being pivotally connected to said lift arm assembly, said draw link being pivotally connected to said second end of said mounting link, said power source being operable to at least initially pivot at least one of said mounting link and said draw link such that said draw latch assembly engages the push beam assembly.

3. The hitch assembly of claim 2, wherein said lift arm assembly further includes a stop mechanism engageable with said draw latch assembly, said stop mechanism engaging said draw latch assembly to limit movement of said mounting link as said mounting link and said draw link are positioned to engage the push beam assembly; whereby said power source is operable to pivot said draw link about said mounting link such that said draw link engages said push beam assembly and pulls said lift arm assembly toward the push beam assembly when said stop mechanism is engaged with said draw latch assembly.

4. The hitch assembly of claim 3, wherein said stop mechanism is pivotally mounted on said lift arm assembly, said stop mechanism being pivotally movable to engage and disengage from said draw latch assembly to allow further movement of said mounting link relative to said lift arm assembly, said power source being operable to pivot said lift arm assembly relative to the push beam assembly and said mounting link to vertically move the plow blade when said draw latch assembly is engaged with said push beam assembly and said stop mechanism is disengaged from said draw latch assembly.

5. The hitch assembly of claim 4, wherein said draw latch assembly further includes a lift stop arm, an intermediate link and a connecting link, said lift stop arm having a first end and a second end, said first end of said lift stop arm including at least one slide pin which slidably engages said lift arm assembly and said second end of said lift stop arm pivotally connecting to said mounting link, said stop mechanism limiting movement of said mounting link by contacting said at least one slide pin, said intermediate link pivotally connecting to said mounting link and said lift arm assembly, said power source pivotally connecting to said intermediate link, said connecting link having a first end and a second end, said first end of said connecting link pivotally connecting to said intermediate link and said second end of said connecting link pivotally connecting to said draw link; whereby when said stop mechanism engages said at least one slide pin on said lift stop arm, said power source is operable to pivot said intermediate link relative to said mounting link which pivots said draw link relative to said mounting link, thereby engaging said draw link with the push beam assembly, and when said stop mechanism is disengaged from said at least one slide pin, said lift stop arm is slidable along said lift arm assembly such that further operation of said power source pivots said lift arm assembly relative to the push beam assembly and at least a portion of said draw latch assembly, thereby vertically moving the plow blade.

6. The hitch assembly of claim 4, wherein said stop mechanism includes a lift stop link and a lever, said lever being interconnected with said lift stop link, said lift stop link being pivotable about an axis on said lift arm assembly by rotational movement of said lever such that said lift stop link is movably engageable with said draw latch assembly.

7. The hitch assembly of claim 6, wherein said lever is a support stand for said lift arm assembly and said draw latch assembly when said hitch assembly is not attached to the vehicle, said lift stop link being engaged with said draw latch assembly when said support stand is in a support position, and said lift stop link being disengaged with said draw latch assembly when said support stand is in a raised position.

8. The hitch assembly of claim 4, wherein said lift arm assembly further includes a mounting lever rotatable in a first direction and a second direction, said first direction being generally opposite said second direction, said lift arm assembly being pivotally attached to the push beam assembly by at least two mounting pins, said at least two mounting pins being removably insertable through corresponding openings in said lift arm assembly and the push beam assembly after said draw latch assembly pulls said hitch assembly toward the push beam assembly, said at least two mounting pins being positioned coaxially to form a first pivot axis, said mounting lever being interconnected with said at least two mounting pins such that said at least two mounting pins engage said corresponding openings in said lift arm assembly and the push beam assembly in response to rotational movement of said mounting lever in said first direction, while said at least two mounting pins disengage from said corresponding openings in said lift arm assembly and the push beam assembly in response to rotational movement of said mounting lever in said second direction, said stop mechanism being interconnected with said mounting lever such that said rotational movement of said mounting lever in said first direction disengages said stop mechanism from said draw latch assembly and rotational movement of said mounting lever in said second direction engages said stop mechanism with said draw latch assembly.

9. The hitch assembly of claim 8, wherein said draw latch assembly includes a support foot along a lower end of said draw link such that when said hitch assembly is not attached to the push beam assembly said power source is operable to pivot said draw link and said support foot relative to said hitch assembly to vertically move said first end of said lift arm assembly.

10. The hitch assembly of claim 3, wherein said draw latch assembly further includes a biasing member interconnected between said mounting link and said draw link, said biasing member providing resistance to rotation of said draw link such that an initial operation of said power source pivots said mounting link relative to said lift arm assembly, said draw link being pivotable relative to said mounting link when said stop mechanism is engaged with said draw latch assembly.

11. The hitch assembly of claim 2, wherein said draw latch assembly includes a support foot along a lower end of said draw link such that operation of said power source when said hitch assembly is not attached to the vehicle pivots said draw link and said support foot relative to said hitch assembly to vertically move said second end of said lift arm assembly.

12. The hitch assembly of claim 1, wherein said lift arm assembly pivotally connects to the push beam assembly in at least two locations spaced laterally apart from one another such that said lift arm assembly pivots about a substantially horizontal pivot axis.

13. The hitch assembly of claim 1, wherein said lift arm assembly is pivotally attached to the push beam assembly by at least two mounting pins, said at least two mounting pins being removably insertable through corresponding openings in said lift arm assembly and the push beam assembly after said draw latch assembly pulls said hitch assembly toward the push beam assembly, said at least two mounting pins being positioned coaxially to form a first pivot axis.

14. The hitch assembly of claim 13, wherein said lift arm assembly further includes a mounting lever rotatable in a first direction and a second direction, said first direction being generally opposite said second direction, said mounting lever being interconnected with said at least two mounting pins such that rotational movement of said mounting lever in said first direction engages said at least two mounting pins with said corresponding openings in said lift arm assembly and the push beam assembly, while rotational movement of said mounting lever in said second direction disengages said at least two mounting pins from said corresponding openings in said lift arm assembly and the push beam assembly.

15. The hitch assembly of claim 13, wherein said lift arm assembly is pivotable relative to the push beam assembly about said first pivot axis, said lift arm assembly being pivotable relative to said draw latch assembly about a second pivot axis, said second pivot axis being offset from said first pivot axis.

16. The hitch assembly of claim 1, wherein said lift arm assembly is pivotable relative to the push beam assembly about a first pivot axis, said lift arm assembly being pivotable relative to said draw latch assembly about a second pivot axis, said second pivot axis being offset from said first pivot axis.

17. The hitch assembly of claim 1, wherein said power source is an hydraulic cylinder.

18. The hitch assembly of claim 1 further including a light tower assembly, said light tower assembly comprising a pair of lamps and a tower frame, said light tower assembly including connections for removable attachment to the push beam assembly.

19. The hitch assembly of claim 1, wherein said second end of said lift arm assembly is adapted for pivotal connection to the plow blade such that the plow blade is pivotable relative to said lift arm assembly about a substantially vertical axis.

20. The hitch assembly of claim 1, wherein said draw latch assembly includes a support foot such that operation of said power source vertically moves at least a portion of said support foot relative to said hitch assembly to vertically move said second end of said lift arm assembly when said hitch assembly is not attached to the vehicle.

21. The hitch assembly of claim 1 further comprising a support stand for supporting said second end of said lift arm assembly when said hitch assembly is disconnected from the vehicle.

22. The hitch assembly of claim 1 further comprising a support stand for adjustably supporting said second end of said lift arm assembly when said hitch assembly is disconnected from the vehicle, said support stand being adjustable to accommodate different heights of the push beam assembly relative to the ground.

23. A hitch assembly adapted for mounting a plow on a vehicle, the vehicle having a frame and a bumper, said hitch assembly comprising:
  a push beam assembly adapted to attach to the frame of the vehicle, said push beam assembly including at least two first mounting flanges extending outwardly therefrom at spaced positions, each said first mounting flange having a first mounting opening therethrough;
  a lift arm assembly having a first end and a second end, said first end of said lift arm assembly adapted for connection with a plow blade, said second end of said lift arm assembly being adapted to removably and pivotally connect to said push beam assembly, said second end of said lift arm assembly including at least two second mounting flanges, each of said second mounting flanges having a second mounting opening therethrough;
  at least two coaxial mounting pins which pivotally attach said lift arm assembly to said push beam assembly such that said lift arm assembly pivots relative to said push beam assembly about a first pivot axis defined by said at least two mounting pins, each of said at least two mounting pins at least initially positioned adjacent one of said second mounting openings on said lift arm assembly and removably insertable through a corresponding pair of said first and second mounting openings of said push beam assembly and said lift arm assembly when said first mounting openings are aligned with said second mounting openings; and
  a mounting lever pivotable about a lever axis in a first direction and a second direction, said first direction being generally opposite said second direction, said mounting lever interconnected with said at least two mounting pins such that said at least two mounting pins engage said second mounting openings of said lift arm assembly and said first mounting openings of said push beam assembly to pivotally secure said lift arm assembly to said push beam assembly in response to a rotational movement of said lever in said first direction, said at least two mounting pins being withdrawn from said first mounting openings so as to detach said lift arm assembly from said push beam assembly in response to a rotational movement of said lever in said second direction.

24. The hitch assembly of claim 23, wherein each of said at least two mounting pins includes a biasing member which biases said mounting pin toward engagement with said first mounting opening of said push beam assembly.

25. The hitch assembly of claim 24, wherein said mounting lever is interconnected with said at least two mounting pins by at least one cable, rotation of said mounting lever in said first direction allows said biasing members to engage said at least two mounting pins with said first mounting openings of said push beam assembly.

26. The hitch assembly of claim 25 further including a draw latch assembly which is pivotally interconnected to said lift arm assembly and operable to engage said push beam assembly and pull said lift arm assembly toward said push beam assembly.

27. The hitch assembly of claim 26, wherein said draw latch assembly includes a draw link and a mounting link, said mounting link having a first and second end, said first end of said mounting link being pivotally interconnected to said lift arm assembly and said draw link being pivotally connected to said second end of said mounting link, said mounting link being pivotable to raise said draw link toward said push beam assembly and said draw link being pivotable to engage said push beam assembly.

28. The hitch assembly of claim 27, wherein said draw link includes a support member along a lower end of said draw link, said support member supporting said draw latch assembly and said lift arm assembly when said second end of said lift arm assembly is not connected with said push beam assembly, and said support member being operable to vertically adjust said draw latch assembly and said lift arm assembly in response to a pivoting of one of said draw link and said mounting link relative to said lift arm assembly.

29. The hitch assembly of claim 26, wherein said draw latch assembly is selectively operable to pull said lift arm assembly toward said push beam assembly and to pivot said lift arm assembly relative to said push beam assembly to vertically move the plow blade.

30. The hitch assembly of claim 29 further including a power source interconnected with said lift arm assembly and said draw latch assembly, said power source operable to at least partially pivot at least one portion of said draw latch assembly such that said draw latch assembly engages said push beam assembly and pulls said lift arm assembly toward said push beam assembly, said power source further operable to at least partially pivot said lift arm assembly relative to said push beam assembly and said at least one portion of said draw latch assembly so as to vertically move the plow blade.

31. The hitch assembly of claim 30, wherein said lift arm assembly includes a stop mechanism engageable with said draw latch assembly, whereby said draw latch assembly is operable to pull said lift arm assembly toward said push beam assembly when said stop mechanism is in an engaged position, and said draw latch assembly is operable to pivot said lift arm assembly relative to said push beam assembly when said stop mechanism is in a disengaged position.

32. The hitch assembly of claim 31, wherein said stop mechanism is interconnected with said mounting handle such that when said mounting handle is moved in said first direction, said stop mechanism correspondingly moves to said disengaged position, and when said mounting handle is moved in said second direction, said stop mechanism correspondingly moves to said engaged position.

33. The hitch assembly of claim 32, wherein said stop mechanism includes a stop link interconnected with said mounting lever, said stop link being connected at a position on said mounting lever which is displaced from said lever axis.

34. The hitch assembly of claim 23, wherein said lift arm assembly further includes at least two pair of bushing support flanges positioned generally parallel and adjacent to each of said at least two second mounting flanges, each of said at least two pair of bushing support flanges being interconnected by a substantially cylindrical bushing having a hollow passageway therethrough, said passageway being along a longitudinal axis of said bushing, said at least two mounting pins being movably insertable through said hollow passageway, said push beam assembly further including at least two forwardly protruding guide flanges having a guide slot therealong, each of said at least two guide flanges being positioned generally parallel and adjacent to said first mounting flanges, said guide slots widening at a forward end to receive said bushings on said lift arm assembly and vertically adjust said second end of said lift arm assembly as said bushings engage said guide slots such that said first and second mounting openings are aligned.

35. The hitch assembly of claim 34, wherein at least one of said at least two second mounting flanges on said lift arm assembly includes an outwardly flared section which flares laterally outwardly from said bushing, one flange on each of said at least two pair of bushing support flanges including an outwardly flared section which flares laterally outwardly from said bushing, such that when said lift arm assembly approaches said push beam assembly for attachment thereto, said flared sections on said at least one of said second mounting flanges and said one of said bushing support flanges on each of said at least two pair of bushing support flanges contact at least one of said first mounting flange and said guide flange to adjust said second end of said lift arm assembly laterally, thereby aligning said first and second openings on said first and second mounting flanges.

36. The hitch assembly of claim 23 further including a draw latch assembly which is pivotally interconnected to said lift arm assembly and operable to engage said push beam assembly and pull said lift arm assembly toward said push beam assembly.

37. The hitch assembly of claim 36, wherein said draw latch assembly is selectively operable to pull said lift arm assembly toward said push beam assembly and pivot said lift arm assembly relative to said push beam assembly to vertically move the plow blade.

38. The hitch assembly of claim 37 further including a power source interconnected with said lift arm assembly and said draw latch assembly, said power source being operable to at least partially pivot at least one portion of said draw latch assembly such that said draw latch assembly engages said push beam assembly and pulls said lift arm assembly toward said push beam assembly, said power source being further operable to at least partially pivot said lift arm assembly relative to said push beam assembly and said at least one portion of said draw latch assembly so as to vertically move the plow blade.

39. The hitch assembly of claim 38, wherein said lift arm assembly includes a stop mechanism engageable with said draw latch assembly, such that when said stop mechanism is engaged with said draw latch assembly, said draw latch assembly is operable to pull said lift arm assembly toward said push beam assembly, and when said stop mechanism is disengaged from said draw latch assembly, said draw latch assembly is operable to pivot said lift arm assembly relative to said push beam assembly.

40. The hitch assembly of claim 39, wherein said stop mechanism is interconnected with said mounting handle, such that when said mounting handle is moved in said first direction, said stop mechanism correspondingly disengages from said draw latch assembly, and when said mounting handle is moved in said second direction, said stop mechanism correspondingly engages with said draw latch assembly.

41. The hitch assembly of claim 23, wherein said push beam assembly is attachable to the frame of the vehicle such that said push beam assembly is positioned substantially rearward of the bumper of the vehicle.

42. The hitch assembly of claim 41 further including a light tower assembly, said light tower assembly comprising a pair of lamps and a tower frame, said tower frame including connections for removable attachment to said push beam assembly.

43. The hitch assembly of claim 42, wherein said push beam assembly includes a pair of outwardly protruding tower brackets, each of said tower brackets including a guide pin protruding laterally outward therefrom and a connecting opening therethrough, said tower frame including a pair of slotted openings at a lower end and a pair of openings through said tower frame spaced from said slotted openings, said slotted openings being engageable with said guide pins on said tower bracket and said openings on said tower frame and said tower bracket being alignable such that a pair of connecting pins are removably insertable therethrough to secure said light tower assembly to said push beam assembly.

44. The hitch assembly of claim 23 further including a light tower assembly, said light tower assembly comprising a pair of lamps and a tower frame, said tower frame including connections for removable attachment to said push beam assembly.

45. The hitch assembly of claim 23 further comprising a support stand for supporting said second end of said lift arm assembly when said hitch assembly is disconnected from said push beam assembly.

46. The hitch assembly of claim 23 further comprising a support stand for adjustably supporting said second end of said lift arm assembly when said hitch assembly is disconnected from said push beam assembly, said support stand being adjustable to accommodate different heights of said push beam assembly on the vehicle relative to the ground.

47. A plow connection assembly adapted for mounting a plow on a vehicle, the vehicle having a center, a frame and a bumper, said plow connection assembly comprising:

a push beam assembly adapted to be secured to the frame of the vehicle, said push beam assembly positioned inward of the bumper toward the center of the vehicle;

a lift arm assembly having a first end and a second end, said first end of said lift arm assembly adapted for connection with a plow blade, said second end of said lift arm assembly adapted to removably and movably connect to said push beam assembly;

a draw latch assembly pivotally interconnected to said lift arm assembly, said draw latch assembly extending from said second end of said lift arm assembly and operable to pivot relative to said lift arm assembly so as to engage said push beam assembly and pull said lift arm assembly toward said push beam assembly for connection thereto.

48. The plow connection assembly of claim 47, wherein said draw latch assembly includes a mounting link and a draw link, said mounting link having a first end and a second end, said first end of said mounting link being pivotally connected to said lift arm assembly, said draw link being pivotally connected to said second end of said mounting link, said draw latch assembly being operable to at least initially pivot at least one of said mounting link and said draw link so as to engage said push beam assembly.

49. The plow connection assembly of claim 48, wherein said draw link includes a support foot extending downwardly from a lower end of said draw link to support said draw latch assembly and said lift arm assembly when said draw latch assembly and said lift arm assembly are not engaged with said push beam assembly, whereby rotation of at least one said draw link and said mounting link relative to said lift arm assembly vertically adjusts said lift arm assembly for alignment with said push beam assembly when said lift arm assembly and said draw latch assembly are not engaged with said push beam assembly.

50. The plow connection assembly of claim 47 further including a power source interconnected with said lift arm assembly and said draw latch assembly, said power source being operable to pivot said draw latch assembly such that said draw latch assembly engages said push beam assembly and pulls said lift arm assembly toward said push beam assembly.

51. The plow connection assembly of claim 50, wherein said draw latch assembly includes a mounting link and a draw link, said mounting link having a first end and a second end, said first end of said mounting link being pivotally connected to said lift arm assembly, said draw link pivotally connecting to said second end of said mounting link, said power source being operable to at least initially pivot at least one of said mounting link and said draw link so as to engage said push beam assembly.

52. The plow connection assembly of claim 50, wherein said draw latch assembly is selectively operable by said power source to pull said lift arm assembly toward said push beam assembly and to pivot said lift arm assembly relative to said push beam assembly, thereby vertically moving the plow blade.

53. The plow connection assembly of claim 52, wherein said lift arm assembly includes a selecting lever pivotally mounted thereon, a rotational movement of said selecting lever selects said draw latch assembly to be operable to one of pull said lift arm assembly toward said push beam assembly and pivot said lift arm assembly relative to said push beam assembly.

54. The plow connection assembly of claim 53, wherein said selecting lever is interconnected to a support stand which is movable to one of a support position and a raised position, said support position being for supporting said lift arm assembly and said draw latch assembly when said lift arm assembly is not attached to said push beam assembly, whereby said draw latch assembly is operable to pull said lift arm assembly toward said push beam assembly when said support stand is in said support position, while said draw latch assembly is operable to pivot said lift arm assembly relative to said push beam assembly when said support stand is in said raised position.

55. The plow connection assembly of claim 47 further comprising a support stand for supporting said second end of said lift arm assembly when said plow connection assembly is disconnected from the vehicle.

56. The plow connection assembly of claim 47 further comprising a support stand for adjustably supporting said second end of said lift arm assembly when said plow connection assembly is disconnected from the vehicle, said support stand being adjustable to accommodate different heights of said push beam assembly on the vehicle relative to the ground.

57. A hitch assembly adapted for mounting a plow on a vehicle, the vehicle having a frame and a bumper, said hitch assembly comprising:

a push beam assembly adapted to attach to the frame of the vehicle, said push beam assembly including at least two first mounting flanges projecting outward therefrom at spaced positions, each said first mounting flange having a first mounting opening therethrough;

a lift arm assembly having a first end and a second end, said first end of said lift arm assembly being adapted for connection with a plow blade, said second end of said lift arm assembly being adapted to removably and pivotally connect to said push beam assembly, said second end of said lift arm assembly including at least two second mounting flanges, each of said second mounting flanges having a second mounting opening therethrough;

a draw latch assembly which selectively pulls said lift arm assembly toward said push beam assembly to align said first and second mounting openings and pivots said lift arm assembly relative to said push beam assembly to vertically move the plow blade;

a power source interconnected with said lift arm assembly and said draw latch assembly, said power source being operable to at least partially move at least one portion of said draw latch assembly such that said draw latch assembly engages the push beam assembly and pulls said lift arm assembly toward the push beam assembly, said power source being further operable to at least partially pivot said lift arm assembly relative to said push beam assembly and said at least one portion of said draw latch assembly so as to pivot and vertically move the plow blade; and at least two coaxial mounting pins for pivotally attaching said lift arm assembly to said push beam assembly such that said lift arm assembly is pivotable relative to said push beam assembly about a first pivot axis defined by said at least two mounting pins, each of said at least two mounting pins at least initially positioned adjacent one of said first and second mounting openings on said first and second mounting flanges and removably insertable through a corresponding pair of said first and second mounting openings of said push beam assembly and said lift arm assembly when said first and second mounting openings are aligned.

58. The hitch assembly of claim 57 further including a mounting lever pivotable about a lever axis in a first direction and a second direction, said first direction being generally opposite said second direction, said mounting lever being interconnected with said at least two mounting pins such that said at least two mounting pins engage said second mounting openings of said lift arm assembly and said first mounting openings of said push beam assembly to pivotally secure said lift arm assembly to said push beam assembly in response to a rotational movement of said lever in said first direction, and said at least two mounting pins being withdrawn from said first mounting openings so as to detach said lift arm assembly from said push beam assembly in response to a rotational movement of said lever in said second direction.

59. The hitch assembly of claim 58, wherein said mounting lever is interconnected with said draw latch assembly such that rotation of said mounting lever in one of said first and second directions selectively engages said draw latch assembly to be operable to one of pull said lift arm assembly toward the push beam assembly to align said first and second mounting openings and pivot said lift arm assembly relative to the push beam assembly to vertically move the plow blade.

60. The hitch assembly of claim 59, wherein said draw latch assembly includes a mounting link, a draw link, a lift stop arm, an intermediate link and a connecting link, said mounting link having a first end and a second end, said first end of said mounting link being pivotally connected to said lift arm assembly, said draw link being pivotally connected to said second end of said mounting link, said lift stop arm having a first end and a second end, said first end of said lift stop arm including at least one slide pin which slidably engages said lift arm assembly and said second end of said lift stop arm pivotally connecting to said mounting link, said mounting lever being interconnected with said draw latch assembly to at least occasionally limit movement of said mounting link by limiting movement of said at least one slide pin, said intermediate link being pivotally connected to said mounting link and said lift arm assembly, said power source being connected to said intermediate link, said connecting link having a first end and a second end, said first end of said connecting link pivotally connecting to said intermediate link and said second end of said connecting link pivotally connecting to said draw link; whereby when said mounting lever is rotated in said second direction, movement of said at least one slide pin is limited and said power source is operable to pivot said intermediate link relative to said mounting link, thereby pivoting said draw link relative to said mounting link such that said draw link engages said push beam assembly, and when said mounting lever is rotated in said first direction, said at least one slide pin on said stop link is slidable along said lift arm assembly such that further operation of said power source pivots said lift arm assembly relative to the push beam assembly and at least a portion of said draw latch assembly, thereby vertically moving the plow blade.

61. The hitch assembly of claim 60, wherein said lift arm assembly further includes a stop mechanism interconnected with said mounting lever and engageable with said at least one slide pin of said draw latch assembly, said stop mechanism engaging said at least one slide pin to limit movement of said mounting link in response to rotational movement of said mounting lever in said second direction.

62. The hitch assembly of claim 61, wherein said draw link includes a support member along a lower end of said draw link, said support member supporting said draw latch assembly and said lift arm assembly when said draw latch assembly and said lift arm assembly are not attached to said push beam assembly and being operable to vertically adjust said draw latch assembly and said lift arm assembly in response to a movement of at least one of said draw link and said mounting link relative to said lift arm assembly.

63. The hitch assembly of claim 61, wherein each of said at least two mounting pins includes a biasing member which biases said mounting pin toward engagement with said first mounting opening of said push beam assembly, said mounting lever being interconnected with said at least two mounting pins by at least one cable, whereby rotation of said mounting lever in said first direction allows said biasing members to engage said at least two mounting pins with said first mounting openings of said push beam assembly, while rotation of said mounting lever in said second direction withdraws said at least two mounting pins from said first mounting openings for detachment of said lift arm assembly from said push beam assembly.

64. The hitch assembly of claim 63, wherein said lift arm assembly further includes at least two pair of bushing support flanges positioned generally parallel to and spaced apart from each of said at least two second mounting flanges, each of said at least two pair of bushing support flanges being interconnected by a substantially cylindrical bushing having a hollow passageway therethrough, said passageway being along a longitudinal axis of said bushing, said at least two mounting pins being movably insertable through said hollow passageway, said push beam assembly further including at least two forwardly extending guide flanges having a guide slot therealong, each of said at least two guide flanges being positioned generally parallel to and spaced apart from said first mounting flanges, said guide slots widening at a forward end to receive said bushings on said lift arm assembly and vertically adjust said second end of said lift arm assembly as said guide slots engage said bushings such that said first and second mounting openings are aligned.

65. The hitch assembly of claim 57 further comprising a support stand for supporting said second end of said lift arm assembly when said hitch assembly is disconnected from said push beam assembly.

66. The hitch assembly of claim 57 further comprising a support stand for adjustably supporting said second end of said lift arm assembly when said hitch assembly is disconnected from said push beam assembly, said support stand being adjustable to accommodate different heights of said push beam assembly on the vehicle relative to the ground.

* * * * *